United States Patent
Kaneda

(10) Patent No.: US 9,599,831 B2
(45) Date of Patent: Mar. 21, 2017

(54) SPATIAL IMAGE DISPLAY APPARATUS

(71) Applicant: Sony Corporation, Tokyo (JP)

(72) Inventor: Kazumasa Kaneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 14/665,087

(22) Filed: Mar. 23, 2015

(65) Prior Publication Data

US 2015/0277133 A1    Oct. 1, 2015

(30) Foreign Application Priority Data

Mar. 31, 2014  (JP) ................. 2014-074866

(51) Int. Cl.
| | | |
|---|---|---|
| G02B 27/22 | (2006.01) | |
| G02B 5/136 | (2006.01) | |
| G03B 21/28 | (2006.01) | |
| G03B 21/20 | (2006.01) | |
| G03B 21/00 | (2006.01) | |

(52) U.S. Cl.
CPC ......... *G02B 27/2292* (2013.01); *G02B 5/136* (2013.01); *G03B 21/00* (2013.01); *G03B 21/208* (2013.01); *G03B 21/28* (2013.01)

(58) Field of Classification Search
CPC .......... G02B 17/08; G02B 5/08; H04N 9/315; H04N 9/3105; G03B 21/28; G03B 21/208
See application file for complete search history.

(56) References Cited

U.S. PATENT DOCUMENTS

| | | | | |
|---|---|---|---|---|
| 6,124,920 A | * | 9/2000 | Moseley | G02B 27/2214 348/E13.004 |
| 2001/0019434 A1 | * | 9/2001 | Popovich | G02B 5/32 359/15 |
| 2011/0298993 A1 | * | 12/2011 | Hirata | B29D 11/00269 348/744 |
| 2012/0257170 A1 | * | 10/2012 | Mochizuki | H01L 33/20 353/30 |
| 2013/0038826 A1 | * | 2/2013 | Imamura | G02B 5/136 349/113 |
| 2013/0100416 A1 | * | 4/2013 | Shimatani | G02B 27/2235 353/10 |

FOREIGN PATENT DOCUMENTS

JP         2008-158114 A      7/2008

* cited by examiner

*Primary Examiner* — Sultan Chowdhury
(74) *Attorney, Agent, or Firm* — Wolf, Greenfield & Sacks, P.C.

(57) ABSTRACT

An spatial image display apparatus includes: a first optical plate that transmits an incident light beam such that transmission gain reaches a peak greater than 1 in an optical axis direction of the incident light beam; and a second optical plate in which a plurality of optical elements are provided in a matrix formation, which regularly reflect a Z axis-direction component of a transmissive light beam of the first optical plate and are retroreflective with X and Y axes-direction components of the transmissive light beam, in a substrate having a normal line in a Z axial direction.

14 Claims, 18 Drawing Sheets

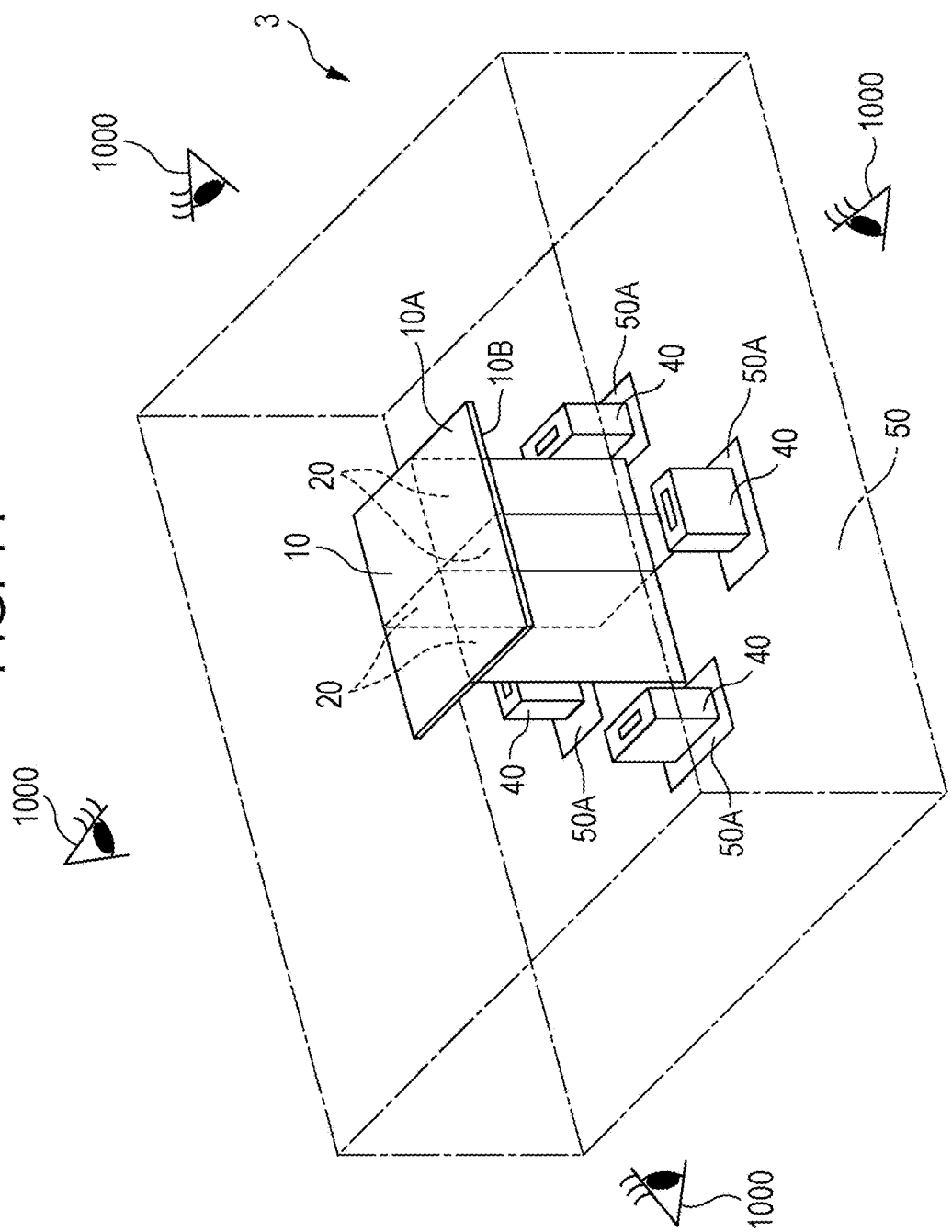

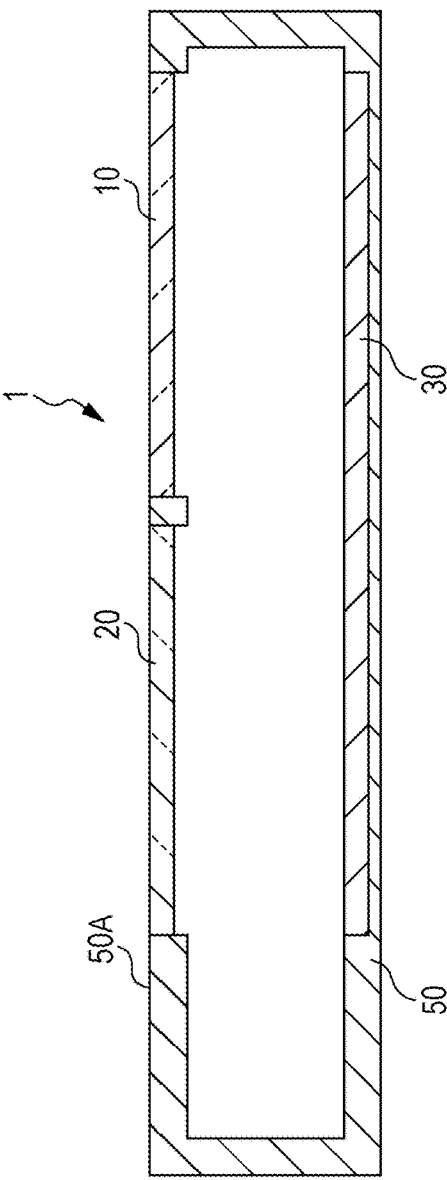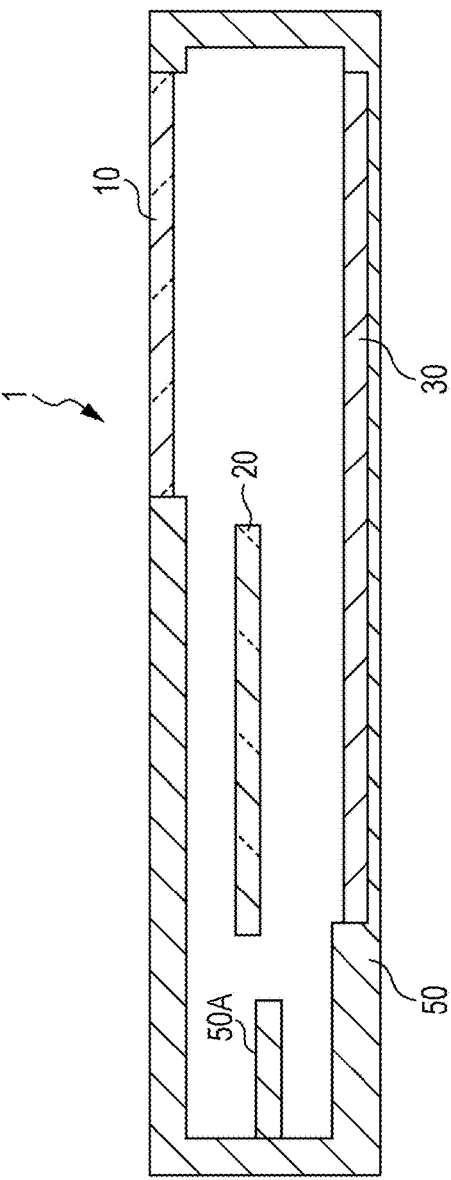

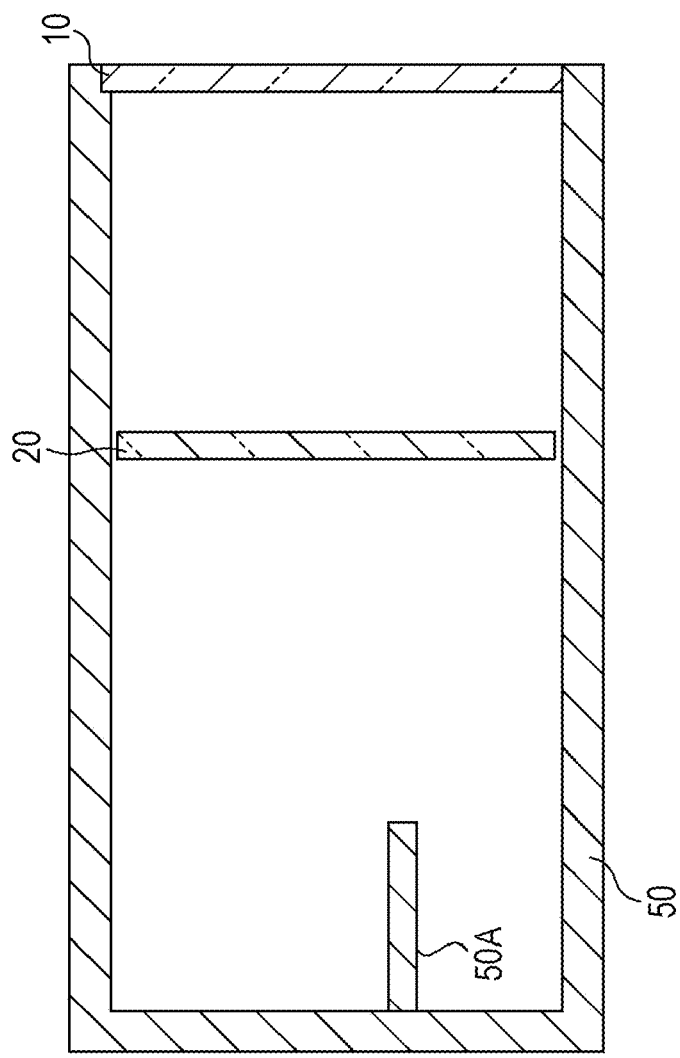

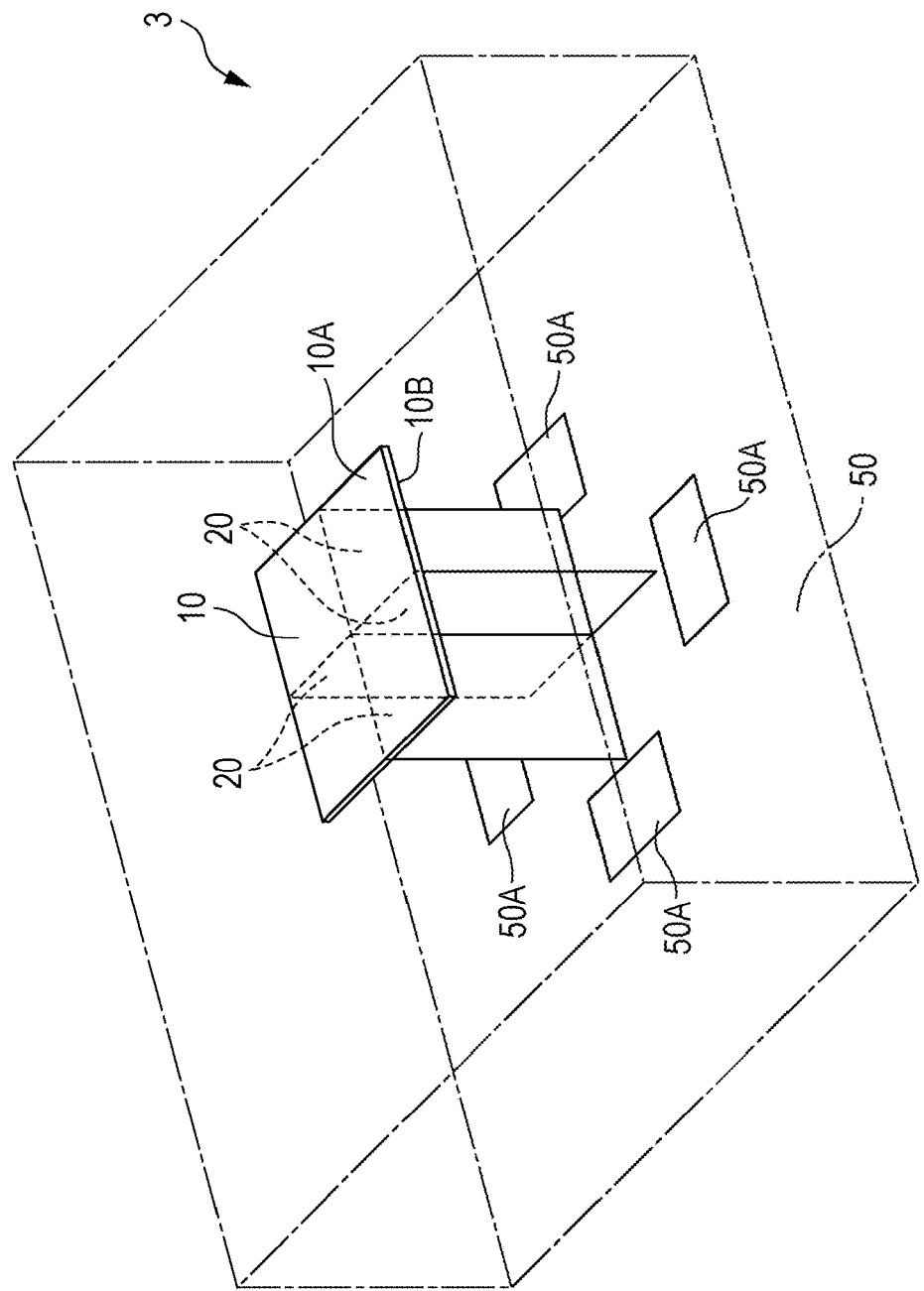

SPATIAL IMAGE DISPLAY APPARATUS

CROSS REFERENCE TO RELATED APPLICATIONS

This application claims the benefit of Japanese Priority Patent Application JP 2014-074866 filed Mar. 31, 2014, the entire contents of which are incorporated herein by reference.

BACKGROUND

The present disclosure relates to an spatial image display apparatus that displays an image in the air.

Japanese Unexamined Patent Application Publication No. 2008-158114 discloses an optical system that uses a plane-symmetric imaging device and forms an image of an object positioned below the underside of the device at a plane-symmetrical position with the top side of the device as a symmetry plane. A plurality of penetrating holes are provided in a matrix formation on a substrate of the plane symmetry imaging device used in the optical system and an optical element that includes two mirror surfaces orthogonal to each other is formed on an inner wall of each hole. When light emitted from the object penetrates the holes, the light is reflected on the two mirror surfaces once, respectively, and then, the reflected light forms an image at a plane-symmetrical position. As a result, the image (real image) is viewed to be levitating above the top surface of the element to an observer.

SUMMARY

Light emitted from an object is Lambertian diverging light which has low angle dependence. Therefore, since only a part of the light emitted from the object is incident to a plane symmetry imaging device, a real image formed in the air does not have sufficiently high luminance. Thus, there is a problem in that it is difficult for an observer to visually recognize the real image due to the low luminance of the real image.

According to an embodiment of the present disclosure, there is provided an spatial image display apparatus which can achieve a real image having higher luminance.

An spatial image display apparatus according to an embodiment of the present disclosure includes a single or a plurality of first optical plate and a second optical plate. The single or the plurality of first optical plates transmit an incident light beam such that transmission gain reaches a peak greater than 1 in an optical axis direction of the incident light beam. In the second optical plate, a plurality of optical elements are provided in a matrix formation, which regularly reflect a Z axis-direction component of a transmissive light beam of the first optical plate and are retroreflective with X and Y axes-direction components of the transmissive light beam, in a substrate having a normal line of a Z axial direction.

In the spatial image display apparatus according to the embodiment of the present disclosure, the first optical plate which transmits the incident light beam such that transmission gain reaches a peak in the optical axis direction of the incident light beam is provided in front of the second optical plate. In this manner, for example, a front surface of the first optical plate is irradiated with projection light of a light source device which has an optical projection system that is able to form an image from the projection light, and a primary image is formed. Then, light having directivity is emitted from a rear surface of the first optical plate and is incident to the second optical plate. In this manner, according to the embodiment of the present disclosure, since the light having the directivity is incident to the second optical plate, it is possible to achieve a significantly high light use efficiency compared to a case where only a part of Lambertian light is incident to the second optical plate. In addition, as the light source device described above, it is possible to use a typical projector. Therefore, for example, performance of the projector enables a light intensity of the primary image to be significantly higher than a light intensity obtained using a flat display.

In the spatial image display apparatus according to the embodiment of the present disclosure, since the first optical plate that transmits an incident light beam is provided in front of the second optical plate such that transmission gain reaches a peak greater than 1 in the optical axis direction of the incident light beam and thereby, it is possible to increase light use efficiency and light intensity from a light source, it is possible to obtain a real image with higher luminance. Effects of the present disclosure are not necessarily limited to the described effects but may include any effects described in the present specification.

BRIEF DESCRIPTION OF THE DRAWINGS

FIG. 14 is a perspective view illustrating an example of a configuration of an spatial image display apparatus according to a third embodiment of the present disclosure;

FIG. 15 is a view illustrating still another modification example of the spatial image display apparatus in FIG. 1;

FIG. 16 is a view illustrating still another modification example of the spatial image display apparatus in FIG. 1;

FIG. 17 is a view illustrating still another modification example of the spatial image display apparatus in FIG. 1;

FIG. 20 is a view illustrating a modification example of the spatial image display apparatus in FIG. 14;

DETAILED DESCRIPTION OF EMBODIMENTS

Hereinafter, embodiments to carry out the present disclosure will be described in detail with respect to the drawings. Description will be provided in the following order.
1. First Embodiment
  Example of Optical Plates 10 and 20 Arranged horizontally side by side
2. Modification Example of First Embodiment
  Modification Example A: Example of Accommodating Projector 40 in Housing 50
  Modification Example B: Example of Superposing Optical Plates 10 and 20
3. Second Embodiment
  Example of Disposing Optical Plates 10 and 20 to Be Orthogonal to Each Other
4. Modification Example of Second Embodiment
  Modification Example C: Example of Including Single Projector 40
5. Third Embodiment
  Example of Including Four Optical Plates 20
6. Modification Example Common to Each Embodiment and Modification Example thereof
  Modification Example D: Example of Including Externally Provided Projector 40

1. First Embodiment

Configuration

Figure 1:
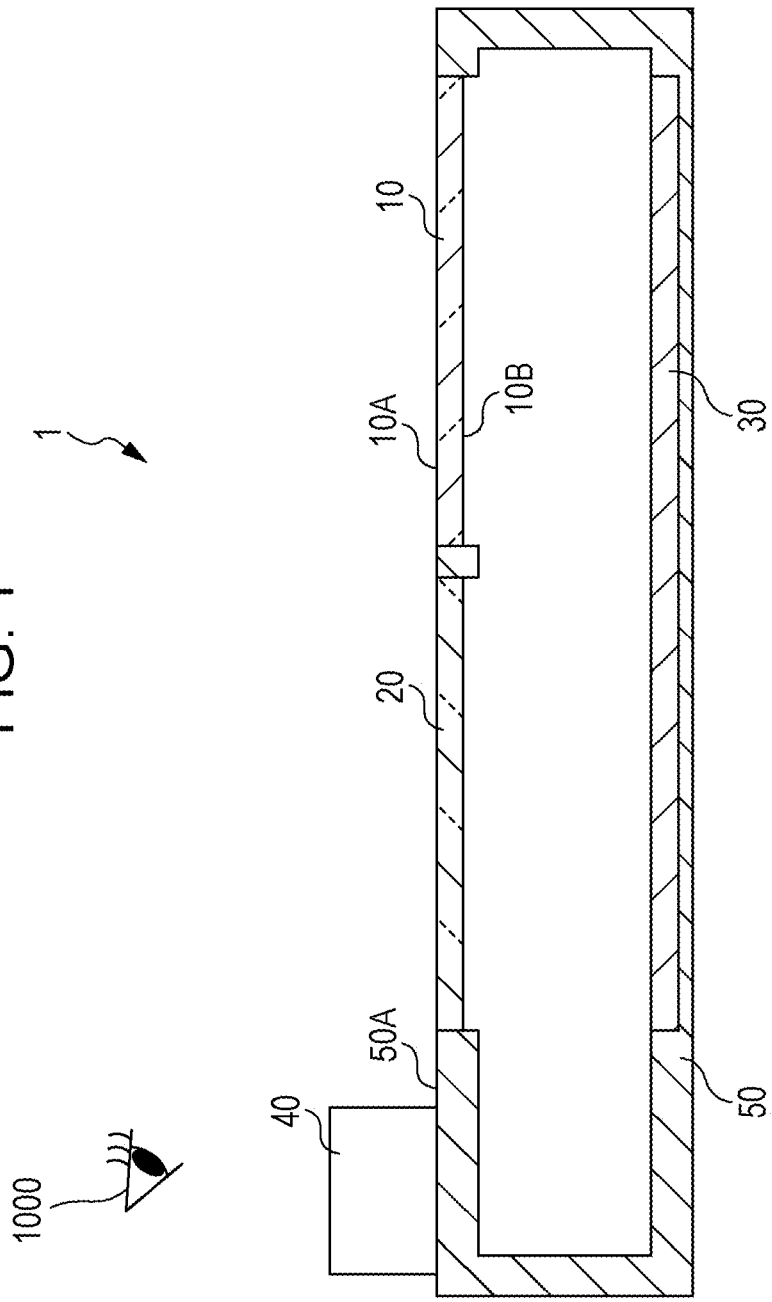
FIG. 1 is a cross-sectional view illustrating an example of a configuration of an spatial image display apparatus according to a first embodiment of the present disclosure.

FIG. 1 is a cross-sectional view illustrating an example of a configuration of an spatial image display apparatus 1 according to a first embodiment of the present disclosure. The spatial image display apparatus 1 displays an image in the air. The spatial image display apparatus 1 includes, for example, optical plates 10 and 20, a reflective plate 30, a projector 40, and a housing 50. An interior space is formed by the optical plates 10 and 20, the reflective plate 30, and the housing 50. The optical plate 10 corresponds to a specific example of a "second optical plate" of the present disclosure. The optical plate 20 corresponds to a specific example of a "first optical plate" of the present disclosure. The reflective plate 30 corresponds to a specific example of a "reflective plate" of the present disclosure. The projector 40 corresponds to a specific example of a "light source device" of the present disclosure.

Optical Plate 10

Figure 2:
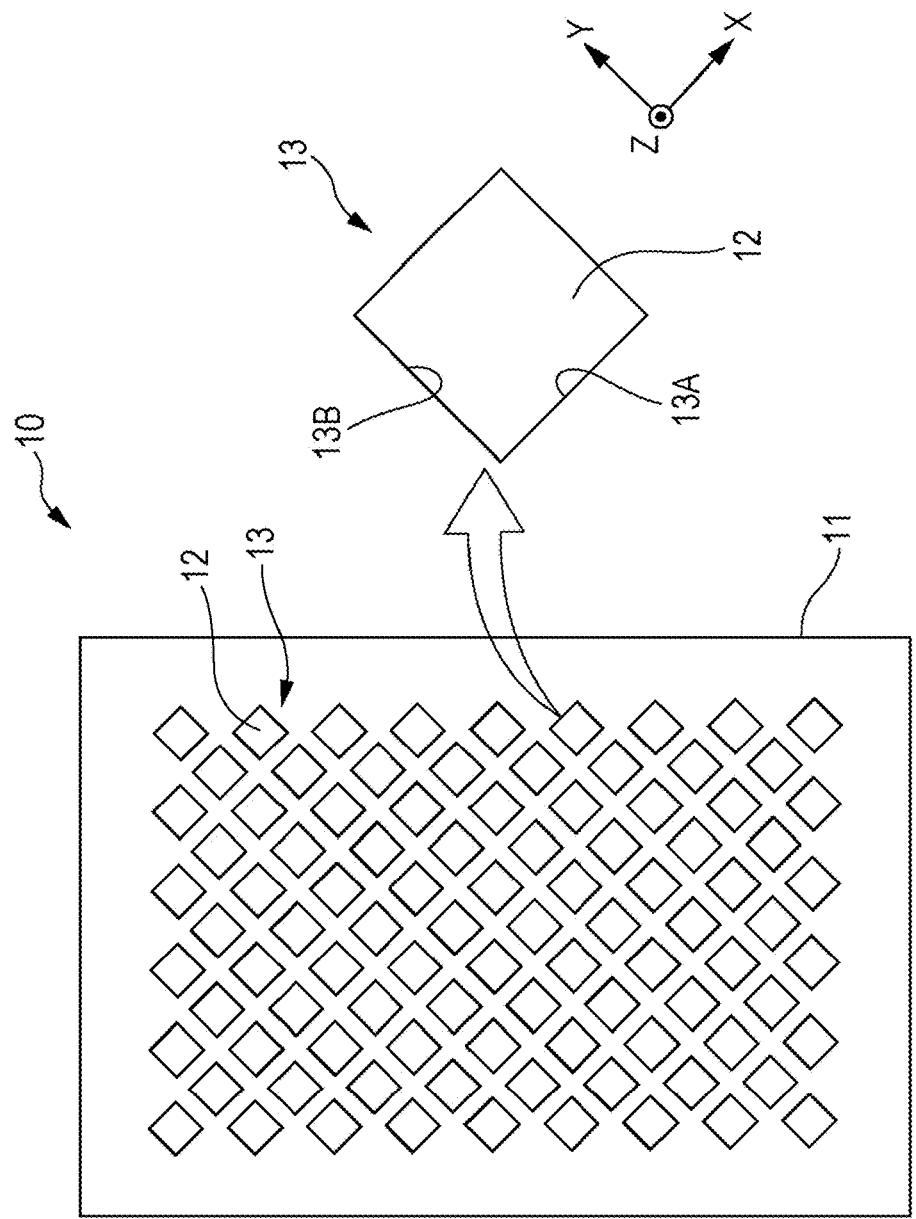
FIG. 2 is a plan view illustrating an example of a configuration of an optical plate in FIG. 1.

FIG. 2 is a plan view illustrating an example of a configuration of an optical plate 10. The optical plate 10 has a plate-shaped substrate 11. Here, a surface of the optical plate 10 (substrate 11) on the observer 1000 is referred to as a front surface 10A and a surface of the optical plate 10 (substrate 11) opposite to the front surface 10A is referred to as a rear surface 10B. In addition, a plane that is parallel to the front surface 10A of the optical plate 10 is referred to as an X-Y plane, a plane that is parallel to a reflective surface 13A to be described later is referred to as an X-Z plane, and a plane that is parallel to a reflective surface 13B to be described later is referred to as a Y-Z plane. In addition, a normal line AX of the optical plate 10 (substrate 11) is parallel to a Z axis.

The optical plate 10 (substrate 11) has a plurality of openings 12 disposed in a plane parallel to the front surface 10A in a matrix formation. Each of the openings 12 penetrates the optical plate 10 in a thickness direction (Z axial direction) and transmits light incident from the rear surface 10B side of the optical plate 10 on the front surface 10A side of the optical plate 10. A diameter of each of the openings 12 becomes, for example, a submicron order (less than 1 μm), a micrometer order (1 μm to 999 μm), or a millimeter order (1 mm to 9 mm). Each of the openings 12 is formed of, for example, a void. Each of the openings 12 is provided, for example, in the substrate 11. Each of the openings 12 may be provided in a convex structure formed on the front surface 10A of the substrate 11. The optical plate 10 (substrate 11) may have a light blocking (light reflective or light observing) member at a portion other than a portion where each of the openings 12 is provided.

An optical element 13 is provided on a side surface of each of the openings 12. That is, the optical plate 10 has a plurality of the optical elements 13 disposed in a plane parallel to the front surface 10A in a matrix formation. Each of the optical elements 13 is configured to have two reflective surfaces 13A and 13B orthogonal to each other. The reflective surface 13A is parallel to the X-Z plane and the reflective surface 13B is parallel to the Y-Z plane. The reflective surface 13A and the reflective surface 13B may be provided on the same layer in the optical plate 10 or may be provided on different layers from each other. In a case where the reflective surface 13A and the reflective surface 13B are provided on the same layer in the optical plate 10, for example, ends of the reflective surface 13A and the reflective surface 13B are in contact with each other, respectively. In a case where the reflective surface 13A and the reflective surface 13B are provided on different layers from each other in the optical plate 10, for example, one corner of the reflective surface 13A and one corner of the reflective surface 13B are in contact with each other, respectively.

Figure 3:
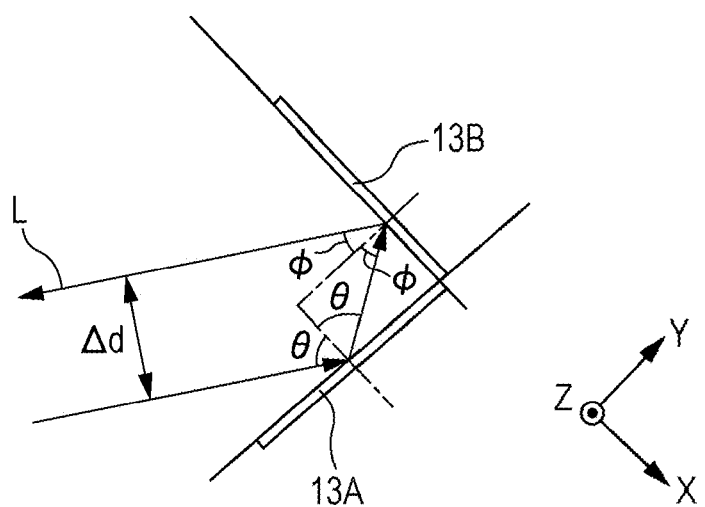
FIG. 3 is a diagram illustrating an example of action of the optical plate in FIG. 1 in an X-Y plane.
Figure 4:
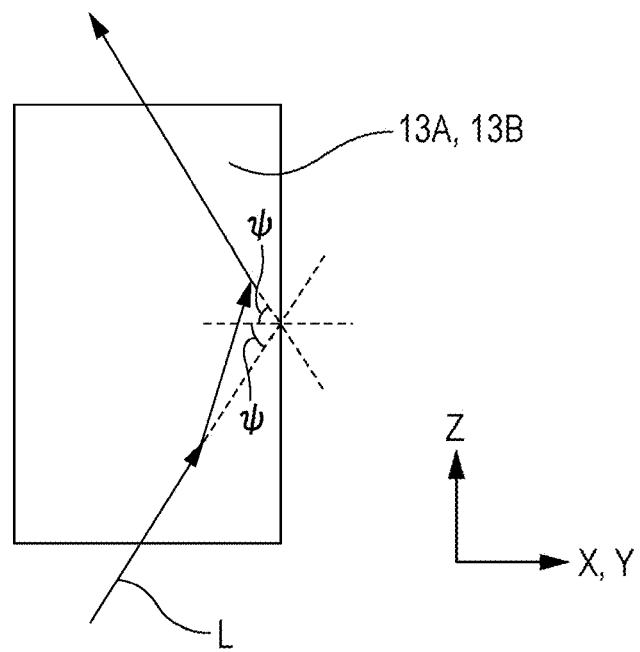
FIG. 4 is a diagram illustrating an example of action of the optical plate in FIG. 1 in an X-Z plane and a Y-Z plane.

FIG. 3 is a diagram illustrating an example of action of the optical plate 10 in the X-Y plane. FIG. 4 is a diagram illustrating an example of action of the optical plate 10 in the X-Z plane and the Y-Z plane. Light L incident on the X-Y plane from the rear surface 10B of the optical plate 10 is incident to the reflective surface 13A at an incidence angle θ, then, after being reflected at an emitting angle θ therefrom, is incident to the reflective surface 13B at an incidence angle φ, and is reflected at an emitting angle φ therefrom. Therefore, light incident to the reflective surface 13A at an angle other than normal line directions of the reflective surfaces 13A and 13B returns in a direction, in which the light travels, by the reflective surfaces 13A and 13B. Here, in each of the optical elements 13, a misalignment amount Δd between an optical axis of the light incident to the optical element 13 and an optical axis of the light reflected and returning from the optical element 13 is smaller than the diameter of the opening 12. Thus, in a case where the diameter of each of the openings 12 is increased to the extent as described above, the XY axial direction components incident to the reflective surface 13A at an angle other than normal line directions of the reflective surfaces 13A and 13B are retroreflective from the reflective surfaces 13A and 13B.

Light L incident on the X-Z plane and the Y-Z plane from the rear surface 10B of the optical plate 10 is incident to the reflective surface 13A at an incidence angle ψ, then, after being reflected at an emitting angle ψ therefrom, is incident to the reflective surface 13B at the incidence angle ψ, is reflected at the emitting angle ψ therefrom, and is emitted to the front surface 10A of the optical plate 10. Therefore, in the Z axial direction, retroreflection does not occur by the reflective surfaces 13A and 13B. As described above, each of the optical elements 13 regularly reflects the Z axial direction component, which is parallel to the normal line AX of the optical plate 10 (substrate 11), of the incident light beam and is retroreflective with XY axial direction components, which are parallel to the rear surface 10B of the optical plate 10, of the incident light beam.

For example, in a case where a light emitter which emits diverging light or a irradiated body is disposed on the rear surface 10B side of the optical plate 10, the diverging light emitted from the light emitter or the irradiated body is transmitted through the optical plate 10 and then, the diverging light is converged (imaged) at a plane-symmetrical position with the optical plate 10 as a reference in a positional relationship with the light emitter or the irradiated body. Thus, the optical plate 10 functions as a plane symmetry imaging device which converges (images) the diverging light from the light emitter or the irradiated body, which is incident to the optical plate 10, at the plane-symmetrical position with the optical plate 10 as a reference in the positional relationship with the light emitter or the irradiated body.

Projector 40

The projector 40 emits, for example, image light as projection light to the outside based on an image signal which is input from the outside. The projector 40 has a projection optical system which can cause the projection light to be imaged. The projection optical system is adjusted at the time of using the projector 40 such that the imaging position becomes the front surface of the optical plate 20 (surface on the observer). That is, the projection light emitted from the projector 40 is primarily imaged on the front surface of the optical plate 20. Hereinafter, an image obtained by the primary imaging is referred to as a real image 300. The projector 40 is disposed at a position at which the optical axis of the projection light obliquely intersects with the normal line of the optical plate 20. It is preferable that the projector 40 may be a short focal type projector, that is, a so-called ultra short throw (UST) projector.

The projector 40 emits the projection light from the projection optical system. The projection light emitted from the projector 40 is incident into the interior space of the spatial image display apparatus 1 through the optical plate 20 and further, is incident to the rear surface 10B of the optical plate 10 through the interior space of the spatial image display apparatus 1. The projector 40 is mounted on an installation section 50A formed in the housing 50. The installation section 50A is, for example, a flat surface formed on an outer side front surface of the housing 50, as illustrated in FIG. 1. The projector 40 is disposed at a position at which the projection light emitted from the projection optical system is obliquely incident to the front surface of the optical plate 20. An incidence angle of the projection light to the front surface of the optical plate 20 is, for example, an angle greater than 45 degrees. Further, the projector 40 is disposed at a position at which the projection light is incident to the reflective plate 30 through the optical plate 20 and, that is, at a position at which the light reflected from the reflective plate 30 is incident to the rear surface 10B of the optical plate 10.

Optical Plate 20

The optical plate 20 is disposed in front of the optical plate 10 on an optical path of the projection light emitted from the projector 40. The optical plate 10 and the optical plate 20 are disposed so as not to face each other. The optical plate 20 is disposed, for example, in the same plane as the optical plate 10. The optical plate 10 and the optical plate 20 are disposed, for example, such that the normal lines thereof are parallel to each other.

Figure 5A:
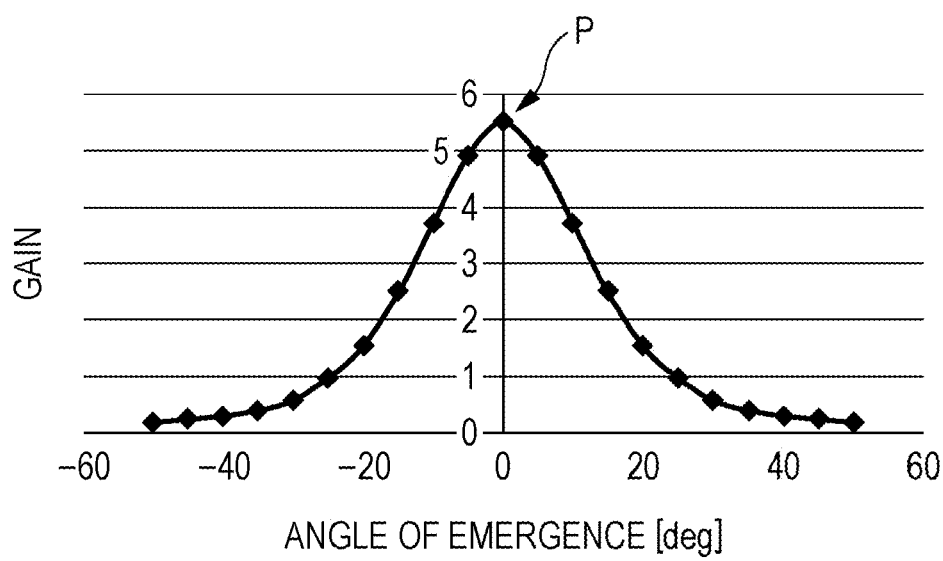
FIG. 5A is a diagram illustrating an example of optical properties of the optical plate in FIG. 1.
Figure 5B:
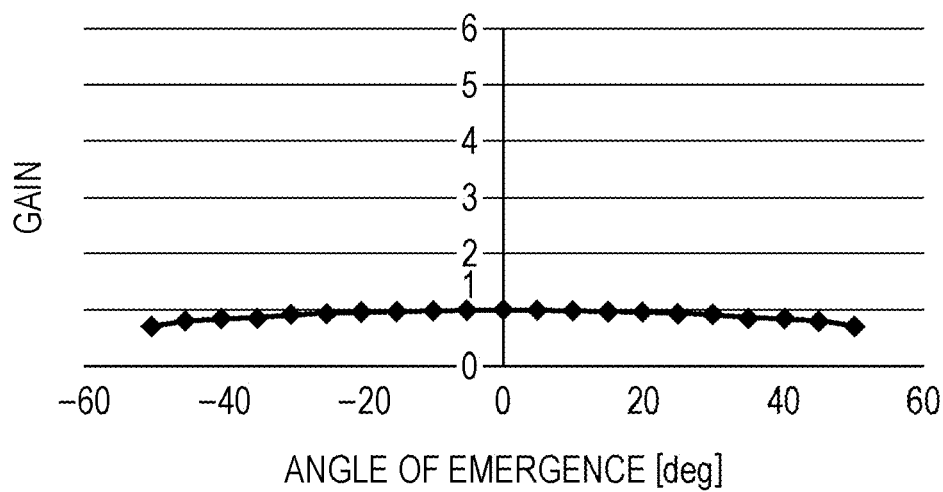
FIG. 5B is a diagram illustrating an example of optical properties of an optical plate according to a comparative example.

FIG. 5A is a diagram illustrating an example of optical properties of the optical plate 20. FIG. 5B is a diagram illustrating an example of optical properties of an optical plate according to a comparative example. FIG. 5B shows optical properties when paper is used as the optical plate according to the comparative example. The optical plate 20 transmits an incident light beam such that transmission gain reaches a peak greater than 1 in the optical axis direction of the incident light beam and causes the transmissive light beam as the diffusion light to be incident to a subsequent optical member (for example, the reflective plate 30 and the optical plate 10). The optical plate 20 is configured of a backside-illumination type high gain screen or a microlens array.

A back surface of the backside-illumination type high gain screen is formed of a surface form similar to, for example, microscopic sine waves. Therefore, when viewed in a micron order, divergence and convergence are produced locally on the back surface of the backside-illumination type high gain screen. However, when viewed in macro, diffusion light having high directivity is emitted from the back surface of the backside-illumination type high gain screen. Thus, the backside-illumination type high gain screen causes the transmissive light beam as the diffusion light to be incident to the subsequent optical member (for example, reflective plate 30 and the optical plate 10).

Figure 6:
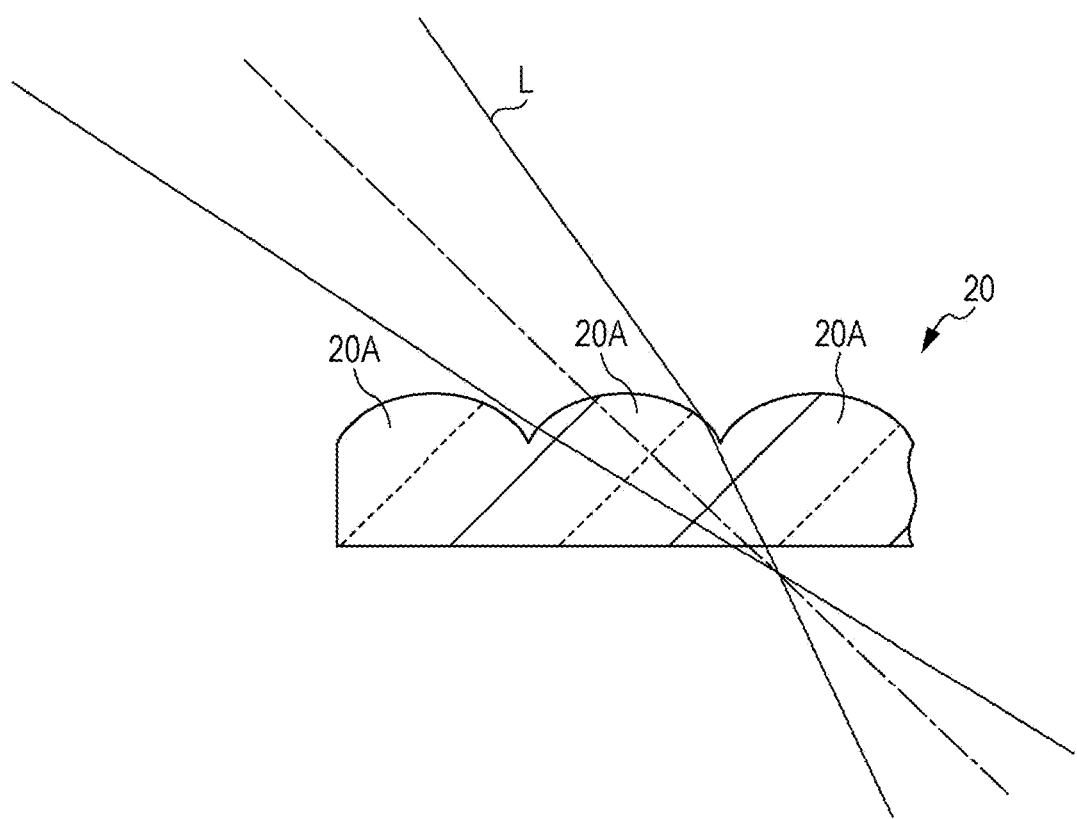
FIG. 6 is a diagram illustrating an example of action of the spatial image display apparatus in FIG. 1.

The microlens array includes, for example, a plurality of minute convex lenses 20A (microlens) that are disposed in a matrix formation in one surface as illustrated in FIG. 6. At the microlens array, the incident light beam is refracted at the convex lens 20A and is temporarily gathered when viewed in a micron order. However, when viewed in the macro, diffusion light with high directivity which has a spread angle limited to a refraction angle of the convex lenses 20A is emitted. Thus, the microlens array causes the transmissive light beam as the diffusion light to be incident to the subsequent optical member (for example, reflective plate 30 and the optical plate 10).

In a case where paper is used as the optical plate, light incident to the optical plate is diffused in the Lambert's law. Therefore, for example, as illustrated in FIG. 5B, there is no emitting angle dependency in the light transmitted through the optical plate and the reflection gain becomes substantially 1 or becomes slightly smaller than 1 at any emitting angle.

In a case where light is incident to the optical plate 20, the optical plate 20 transmits the incident light beam such that the transmission gain reaches a peak greater than 1 in the optical axis direction of the incident light beam. The same is true of a case where the optical axis of the incident light beam is oblique to the normal line of the optical plate 20. FIG. 5A illustrates an example of the emitting angle dependency of the transmission gain of the light transmitted through the optical plate 20 when the optical axis of the incident light beam is parallel to the normal line of the optical plate 20. In FIG. 5A, the transmission gain reaches a peak P when the emitting angle is 0 degrees, that is, in a direction parallel to the optical axis of the incident light beam. A value of the peak P becomes significantly greater than 1. Further, the transmission gain becomes significantly greater than 1 even in a range of a predetermined emitting angle (for example, ±20° or greater of the emitting angle). On the other hand, the transmission gain becomes significantly less than 1 out of the range of a predetermined emitting angle (for example, within ±20° of the emitting angle). That is, the optical plate 20 gathers light in the optical axis direction of the incident light beam and transmits the incident light beam.

The optical plate 20 may have AR coating which reduces reflection of the projection light on the front surface (surface to which the projection light is incident) of the optical plate 20. In a case where the optical plate 20 is configured of the backside-illumination type high gain screen or the microlens array, it is preferable that the AR coating is provided on a light incident surface of the backside-illumination type high gain screen or on a light incident surface of the microlens array.

Reflective Plate 30

Figure 7:
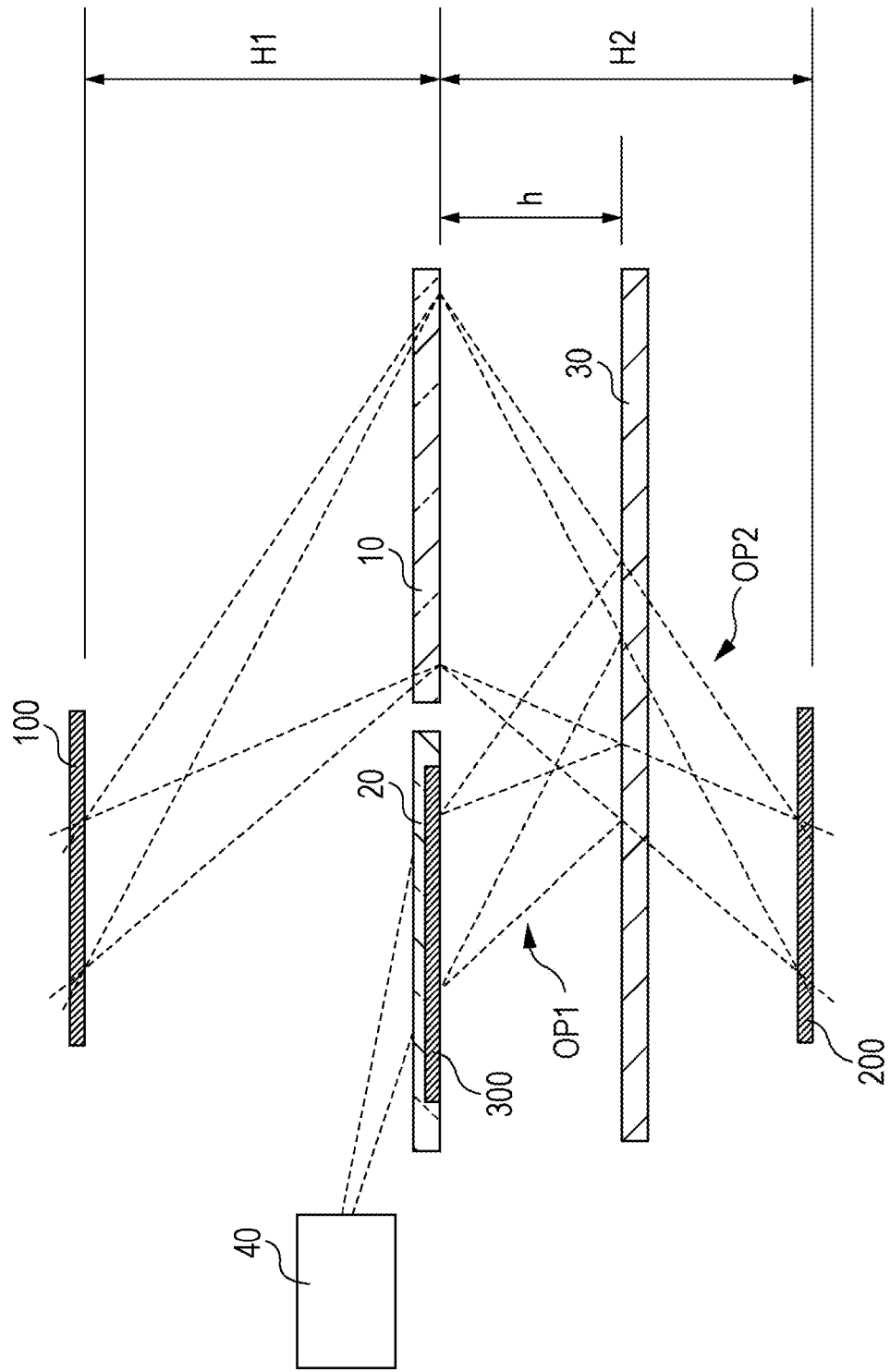
FIG. 7 is a diagram illustrating an example of action of the optical plate in FIG. 1.

FIG. 7 illustrates an example of action of the spatial image display apparatus 1. The reflective plate 30 reflects light which is emitted from the projector 40 disposed at a predetermined position on the front surface side of the optical plate 20 (on the observer 1000 side) and which is transmitted through the optical plate 20 and thereby causes the light to be obliquely incident to the rear surface 10B of the optical plate 10 in a state of the diffusion light. FIG. 7 illustrates an optical path when a type of optical plate which causes the incident light beam to be transmitted and diffused is used as the optical plate 20.

Here, after the light emitted from the projector 40 is reflected from the reflective plate 30, the light is transmitted through the optical plate 10 from the rear surface 10B. As a result, the light forms an image and the image formed on the front surface 10A side of the optical plate 10 is referred to as a real image 100. In addition, a plane-symmetrical position in relation to the real image 100 with a surface including the optical plate 10 as a reference is referred to as a symmetry site 200. At this time, the reflective plate 30 is disposed on the rear surface 10B side of the optical plate 10 and closer to the rear surface 10B than the symmetry site 200.

The reflective plate 30 is disposed between the symmetry site 200 and the plurality of optical elements 13 in the optical plate 10. That is, the reflective plate 30 reflects the light incident from an orientation of the plane-symmetrical position (real image 300) with a surface including the reflective plate 30 as a reference in relation to the symmetry site 200, toward the plurality of optical elements 13. The reflective plate 30 is disposed in the same layer as a space between the rear surface 10B and the symmetry site 200 and is disposed to be parallel to or oblique to the rear surface 10B of the optical plate 10 (substrate 11). FIG. 1 and FIG. 7 illustrate examples in which the reflective plate 30 is disposed to be parallel to the rear surface 10B of the optical plate 10.

Housing 50

The housing 50 forms the interior space of the spatial image display apparatus 1 along with the optical plates 10 and 20 and the reflective plate 30. The housing 50 has, for example, a box shape. The housing 50 supports the projector 40 on the installation section 50A. The installation section 50A has a structure in which the projector 40 is disposed at a position at which the optical axis of the projection light obliquely intersects with the normal line of the optical plate 20 at the time of operation of the spatial image display apparatus 1. The housing 50 supports, in addition to the projector 40, further, for example, the optical plates 10 and 20 and the reflective plate 30. The housing 50 may have a light-absorbing member on the inner surface thereof.

Action and Effects

Next, action and effects of the spatial image display apparatus 1 will be described with reference to FIG. 7.

The projection light emitted from the projector 40 forms an image on the front surface of the optical plate 20. Light of the formed image (real image 300) is incident as diffusion light to the subsequent optical member (reflective plate 30) by the optical plate 20. At this time, transmission gain in the light transmitted through the optical plate 20 reaches a peak greater than 1 in the optical axis direction of the incident light beam. The light transmitted through the optical plate 20 is reflected from the reflective plate 30 and is obliquely incident to the rear surface 10B of the optical plate 10. In the light obliquely incident to the rear surface 10B of the optical plate 10, a Z axial direction component parallel to the normal line AX of the optical plate 10 (substrate 11) is reflected and X and Y axial direction components parallel to the rear surface 10B of the optical plate 10 are retroreflective. The light transmitted through the optical plate 10 in this manner converges (images) at the plane-symmetrical position in relation to the symmetry site 200 with the surface including the optical plate 10 as a reference and forms the real image 100. In this manner, although the real image 300 produced by the projection light emitted from the projector 40 is not present on the symmetry site 200, the real image 100 is formed as though the real image 300 is present at the symmetry site 200.

According to the present embodiment, the optical plate 20 which transmits the incident light beam is disposed in front of the optical plate 10 such that the transmission gain reaches a peak greater than 1 in the optical axis direction of the incident light beam. Accordingly, for example, the front surface of the optical plate 20 is irradiated with the projection light of the projector 40 and an image is primarily formed. Then, diffusion light with directivity is emitted from the rear surface of the optical plate 20 and is incident to the optical plate 10 through the reflective plate 30. In this manner, according to the present embodiment, since the diffusion light with the directivity is incident to the optical plate 10, it is possible to significantly increase light-using efficiency, compared to a case where only a part of the Lambertian light is caused to be incident to the optical plate 10. In addition, according to the present embodiment, since the projector 40 is used as a light source, it is possible to significantly increase light intensity that is obtained by the primary imaging using the performance of the projector 40 more than light intensity that is obtained by the flat display. Hence, according to the present embodiment, since it is possible to increase the light-using efficiency and light intensity from the light source, it is possible to obtain a real image with higher luminance.

According to the present embodiment, by providing the reflective plate 30, reflection of the light emitted from the real image 300 occurs once until reaching the rear surface 10B of the optical plate 10. Therefore, an optical path OP1 of the light emitted from the real image 300 until reaching the rear surface 10B of the optical plate 10 is not straight, but is bent at one place. In a case where the real image 300 is produced at the symmetry site 200 and the reflective plate 30 is omitted, an optical path OP2 of the light emitted from the real image 300 until reaching the rear surface 10B of the optical plate 10 is straight. At this time, the position (symmetry site 200) of the real image 300 is a position farther from the rear surface 10B of the optical plate 10, compared to a position of the real image 300 at the original position in the present embodiment.

Here, a distance (that is, a descending amount H2 of the symmetry site 200) from the rear surface 10B of the optical plate 10 to the lower end of the symmetry site 200 is equal to a distance (that is, a levitating amount H1 of the real image 100) from the front surface 10A of the optical plate 10 to the upper end of the real image 100. Hence, in a case where the optical plate 20 is disposed in the same plane as the optical plate 10, the levitating amount H1 is represented by the following equation when a thickness of the spatial image display apparatus 1 in the Z axial direction is h.

$$H1=H2=2h$$

In this manner, according to the present embodiment, the levitating amount H1 of the real image 100 becomes twice the thickness h of the spatial image display apparatus 1 in the Z axial direction. Hence, according to the present embodiment, by providing the reflective plate 30, it is possible to have a thin thickness h of the spatial image display apparatus 1 in the Z axial direction, compared to the levitating amount H1 of the real image 100.

In addition, according to the present embodiment, in a case where the optical plate 10 (substrate 11) has a light blocking (light reflective or light-absorbing) member in a portion other than the portion in which the openings 12 are formed, it is possible to decrease leakage of light which does not contribute to forming the real image 100 to the outside. As a result, a display quality of the real image 100 is improved.

In addition, according to the present embodiment, the spatial image display apparatus 1 may include a mechanism which changes the direction of the real image 300. By providing such mechanism, it is possible to change the direction of the real image 300, for example, depending on contents of the real image 300 or a direction of a line of sight of the observer 1000.

2. Modification Example of First Embodiment

Modification Example A

Figure 8:
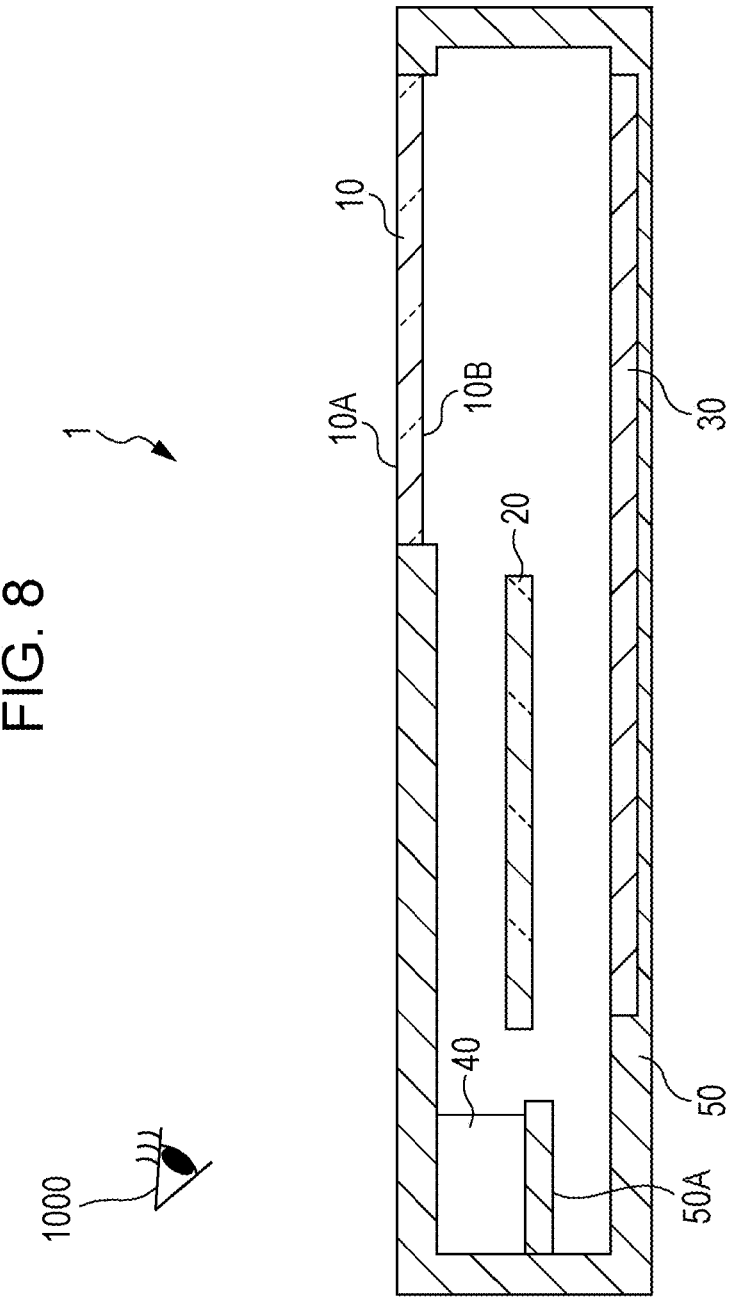
FIG. 8 is a view illustrating a modification example of the spatial image display apparatus in FIG. 1.

FIG. 8 illustrates a modification example of the spatial image display apparatus 1 of the embodiment described above. According to the present modification example the optical plate 20 is not disposed in the same plane as the optical plate 10 but is disposed to be closer to the reflective plate 30 than the optical plate 10. Further, according to the present modification example, the installation section 50A is formed inside the housing 50 (in the interior space of the spatial image display apparatus 1) and the projector 40 is also disposed inside the housing 50 (in the interior space o the spatial image display apparatus 1). Even in such a case, similar to the embodiment described above, it is possible to obtain a real image with higher luminance.

According to the present modification example, when a distance between the optical plate 20 and the reflective plate 30 is d, the levitating amount H1 is represented by the following equation.

$$H1=H2=h+d$$

In this manner, according to the present modification example, the levitating amount H1 of the real image 100 becomes greater than the thickness h of the spatial image display apparatus 1 in the Z axial direction. Hence, according to the present modification example, by providing the reflective plate 30, it is possible to have a thin thickness h of the spatial image display apparatus 1 in the Z axial direction, compared to the levitating amount H1 of the real image 100.

Modification Example B

Figure 9:
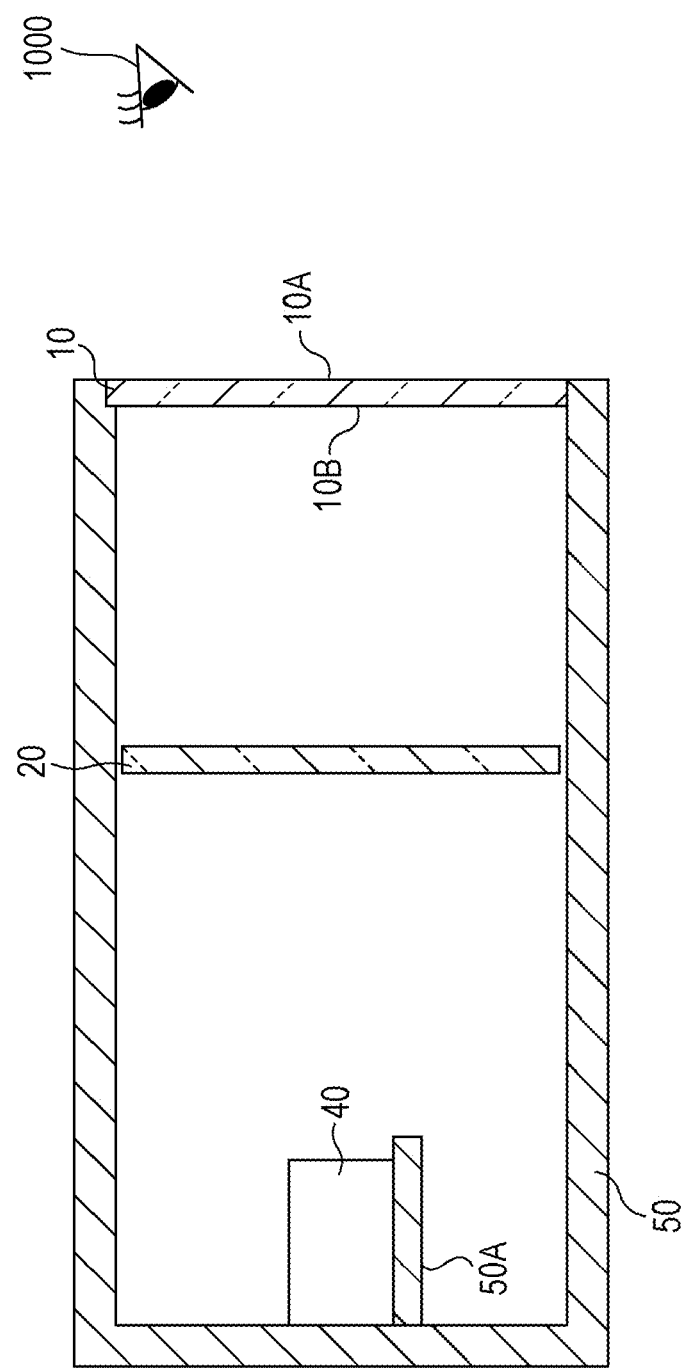
FIG. 9 is a view illustrating another modification example of the spatial image display apparatus in FIG. 1.

FIG. 9 illustrates another modification example of the spatial image display apparatus 1 of the embodiment described above. According to the present modification example, the optical plates 10 and 20 are superposed to each other with a predetermined space therebetween and are disposed to face each other. According to the present modification example, the reflective plate 30 of the embodiment described above is omitted and the projection light emitted from the projector 40 is directly incident to the optical plate 20. Even in such a case, similar to the embodiment described above, it is possible to obtain a real image with higher luminance.

According to the present modification example, the installation section 50A may be formed inside the housing 50 (in the interior space of the spatial image display apparatus 1) and the projector 40 may also be disposed inside the housing 50 (in the interior space o the spatial image display apparatus 1). At this time, the projector 40 may be disposed at a position at which the projection light emitted from the projection optical system is obliquely incident to the front surface of the optical plate 20, or may be disposed at a position at which the projection light emitted from the projection optical system is perpendicularly incident to the front surface of the optical plate 20.

3. Second Embodiment

Configuration

Figure 10:
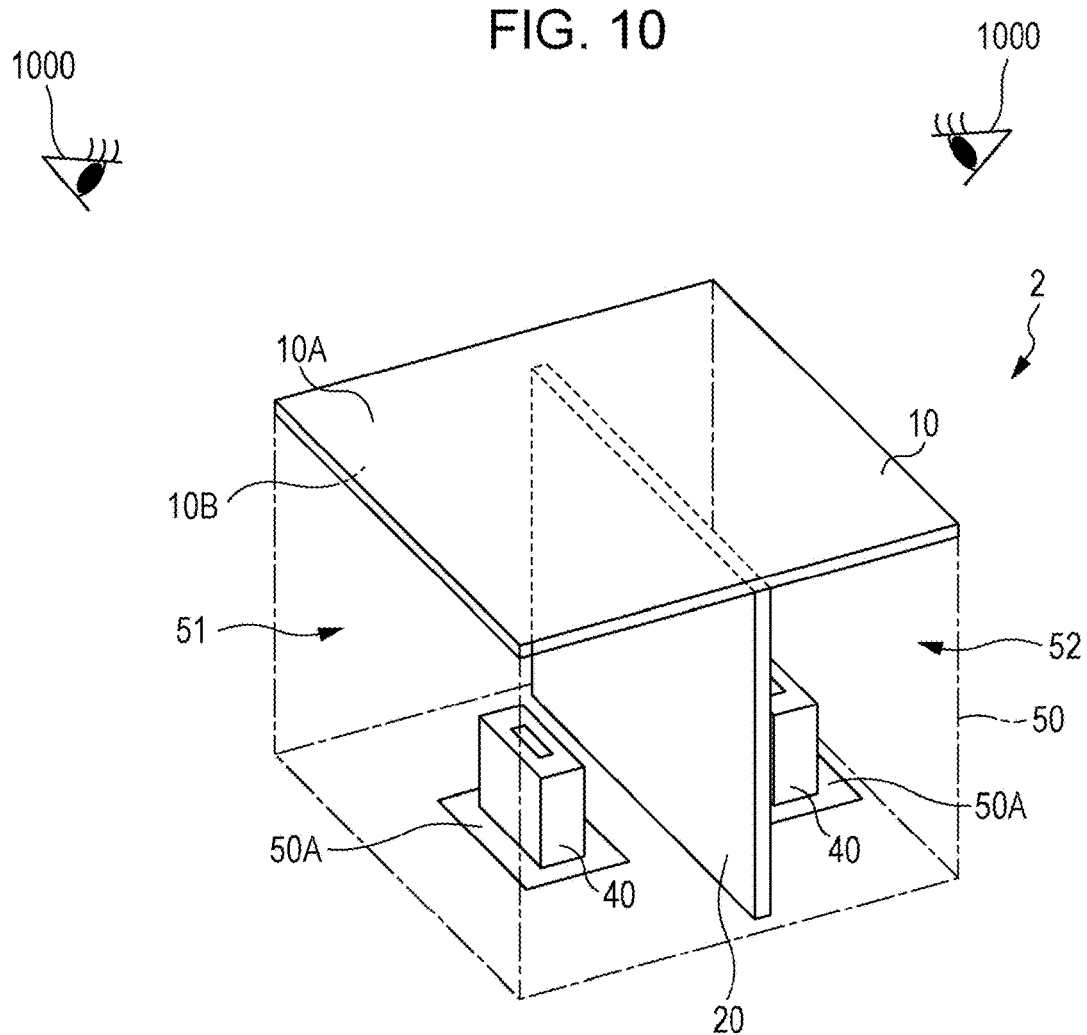
FIG. 10 is a perspective view illustrating an example of a configuration of an spatial image display apparatus according to a second embodiment of the present disclosure.
Figure 11:
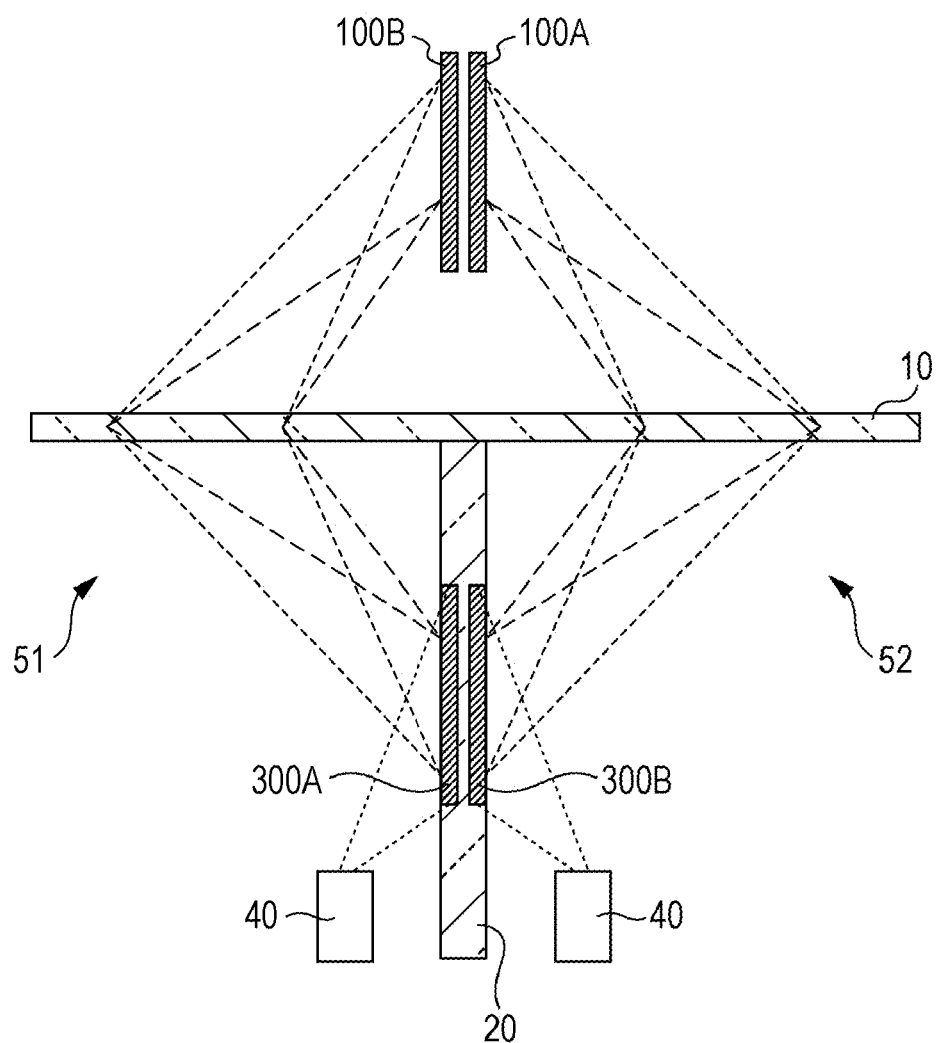
FIG. 11 is a diagram illustrating an example of action of the spatial image display apparatus in FIG. 10.

Next, an spatial image display apparatus 2 according to a second embodiment of the present disclosure will be described. FIG. 10 is a perspective view illustrating an example of a configuration of the spatial image display apparatus 2. FIG. 11 illustrates an example of action of the spatial image display apparatus 2. The spatial image display apparatus 2 displays an image in a space. The spatial image display apparatus 2 includes, for example, the optical plates 10 and 20, two projectors 40, and a housing 50. FIG. 10 illustrates a perspective view of a configuration of the spatial image display apparatus 2 with a transparent housing 50.

Projector 40

Each of the projectors 40 has the projection optical system which can cause the projection light to be imaged. In each of the projectors 40, the projection optical system is adjusted at the time of using the projector 40 such that the imaging position becomes the front surface of the optical plate 20. That is, the projection light emitted from each of the projector 40 is primarily imaged on the front surface of the optical plate 20. One projector 40 causes to form a primary image on one surface of the common optical plate 20 and the other projector 40 causes to form a primary image on the other surface of the common optical plate 20. That is, the optical plate 20 is irradiated from both surfaces by the two projectors 40. Hereinafter, a formed image obtained by the projection light emitted from the one projector 40 is referred to as a real image 300A. In addition, a formed image obtained by the projection light emitted from the other projector 40 is referred to as a real image 300B. For example, as illustrated in FIG. 11, regions of the optical plate 20 which face each other are irradiated by the projector 40, respectively. Hence, the real image 300A and the real image 300B face each other.

Each of the projectors 40 is disposed at a position at which the optical axis of the projection light obliquely intersects with the normal line of the optical plate 20. The one projector 40 is disposed on the one surface side of the common optical plate 20 and is disposed at a position at which the optical axis of the projection light obliquely intersects with the normal line of the optical plate 20. The other projector 40 is disposed on the other surface side of the common optical plate 20 and is disposed at a position at which the optical axis of the projection light obliquely intersects with the normal line of the optical plate 20. Each of the projectors 40 emits the projection light from the projection optical system. Projection light emitted from the one projector 40 is incident to an adjacent interior space through an interior space in which the one projector 40 is accommodated and the optical plate 20 and is incident to the rear surface 10B of the optical plate 10. Projection light emitted from the other projector 40 is incident to an adjacent interior space through an interior space in which the other projector 40 is accommodated and the optical plate 20 and is incident to the rear surface 10B of the optical plate 10.

The projectors 40 are mounted on the installation sections 50A formed in the housing 50, respectively. Each of the installation sections 50A is formed, for example, on the bottom of the housing 50, as illustrated in FIG. 10. Each of the projectors 40 is disposed at a position at which the projection light emitted from the projection optical system is obliquely incident to the front surface of the optical plate 20. An incidence angle of the projection light to the front surface of the optical plate 20 is, for example, an angle greater than 45 degrees. Further, each of the projectors 40 is disposed at a position at which the projection light is obliquely incident to the rear surface 10B of the optical plate 10 through the optical plate 20.

Optical Plate 20

The optical plate 20 is disposed in front of the optical plate 10 on the optical path of the projection light emitted from the projector 40. The optical plate 10 and the optical plate 20 are disposed so as not to face each other. The optical plate 20 is disposed at a position so as to confront the optical plate 10 and is disposed so as to be parallel to or to obliquely intersect with the normal line of the optical plate 10.

The optical plate 20 transmits the incident light beam such that transmission gain reaches a peak greater than 1 in the optical axis direction of the incident light beam. The optical plate 20 causes the transmissive light as the diffusion light to be incident to the rear surface 10B of the optical plate 10. FIG. 11 illustrates an optical path when a type of optical plate which causes the incident light beam to be transmitted and diffused is used as the optical plate 20.

After the light emitted from the projector 40 is transmitted through the optical plate 20, the light is transmitted through the optical plate 10 from the rear surface 10B. As a result, the light forms an image and the image formed on the front surface 10A side of the optical plate 10 is referred to as a real image 100. After the light emitted from the one projector 40 forms an image on the optical plate 20 and the real image 300A is produced, the light emitted from the real image 300A is transmitted through the optical plate 10 from the rear surface 10B. As a result, the light forms an image and the image formed on the front surface 10A side of the optical plate 10 is referred to as a real image 100A. In addition, after the light emitted from the other projector 40 forms an image on the optical plate 20 and the real image 300B is produced, the light emitted from the real image 300B is transmitted through the optical plate 10 from the rear surface 10B. As a result, the light forms an image and the image formed on the front surface 10A side of the optical plate 10 is referred to as a real image 100B.

Housing 50

The housing 50 forms the interior space of the spatial image display apparatus 2 along with the optical plates 10 and 20. The housing 50 has, for example, a box shape. The housing 50 supports the projector 40 on the installation section 50A. The installation section 50A has a structure in which the projector 40 is disposed at a position at which the optical axis of the projection light obliquely intersects with the normal line of the optical plate 20 at the time of operation of the spatial image display apparatus 2. The housing 50 supports, in addition to the projector 40, further, for example, the optical plates 10 and 20. The housing 50 may have a light-absorbing member on the inner surface thereof.

Action and Effects

Next, action and effects of the spatial image display apparatus 2 will be described with reference to FIG. 11.

The projection light emitted from the one projector 40 forms an image on the front surface of the optical plate 20. Light of the formed image (real image 300) is incident as diffusion light to the optical plate 10 by the optical plate 20. At this time, transmission gain in the light transmitted through the optical plate 20 reaches a peak greater than 1 in the optical axis direction of the incident light beam. The light transmitted through the optical plate 20 is obliquely incident to the rear surface 10B of the optical plate 10 through an interior space 52. In the light obliquely incident to the rear surface 10B of the optical plate 10, a Z axial direction component parallel to the normal line AX of the optical plate 10 (substrate 11) is reflected and X and Y axial direction components parallel to the rear surface 10B of the optical plate 10 are retroreflective. The light transmitted through the optical plate 10 in this manner converges (images) at the plane-symmetrical position in relation to the real image 300A with the surface including the optical plate 10 as a reference and forms the real image 100A.

The projection light emitted from the other projector 40 forms an image on the front surface of the optical plate 20. Light of the formed image (real image 300B) is incident as diffusion light to the optical plate 10 by the optical plate 20. At this time, transmission gain in the light transmitted through the optical plate 20 reaches a peak greater than 1 in the optical axis direction of the incident light beam. The light transmitted through the optical plate 20 is obliquely incident to the rear surface 10B of the optical plate 10 through an interior space 51. In the light obliquely incident to the rear surface 10B of the optical plate 10, a Z axial direction component parallel to the normal line AX of the optical plate 10 (substrate 11) is reflected and X and Y axial direction components parallel to the rear surface 10B of the optical plate 10 are retroreflective. The light transmitted through the optical plate 10 in this manner converges (images) at the plane-symmetrical position in relation to the real image 300B with the surface including the optical plate 10 as a reference and forms the real image 100B.

According to the present embodiment, the real image 100A and the real image 100B are produced substantially at the same place. However, in a case where the observer 1000 is present on the left side in FIG. 11, the observer 1000 can recognize only light emitted from the real image 100A. Therefore, the observer 1000 present on the left side in FIG. 11 visually recognizes only the real image 100A levitating in the air. On the other hand, in a case where the observer 1000 is present on the right side in FIG. 11, the observer 1000 can recognize only light emitted from the real image 100B. Therefore, the observer 1000 present on the right side in FIG. 11 visually recognizes only the real image 100B levitating in the air.

Here, the projection light emitted from the one projector 40 becomes image light in front of a certain object (for example, human being) and the real image 100A becomes an image (that is, an image in front of a certain object (for example, human being)) corresponding to the image light. Further, the projection light emitted from the other projector 40 becomes image light at the rear of a certain object (for example, human being) and the real image 100B becomes an image (that is, an image at the rear of a certain object (for example, human being)) corresponding to the image light. At this time, when the observer 1000 walks around the spatial image display apparatus 2, the observer 1000 perceives that the object (for example, human being) is present in a state of levitating in the air at the place where the real image 100A and the real image 100B are produced. In this manner, according to the present embodiment, images different from each other are projected from the projectors 40 and thereby, it is possible to display an image corresponding to an observing position.

4. Modification Example of Second Embodiment

Modification Example C

Figure 12:
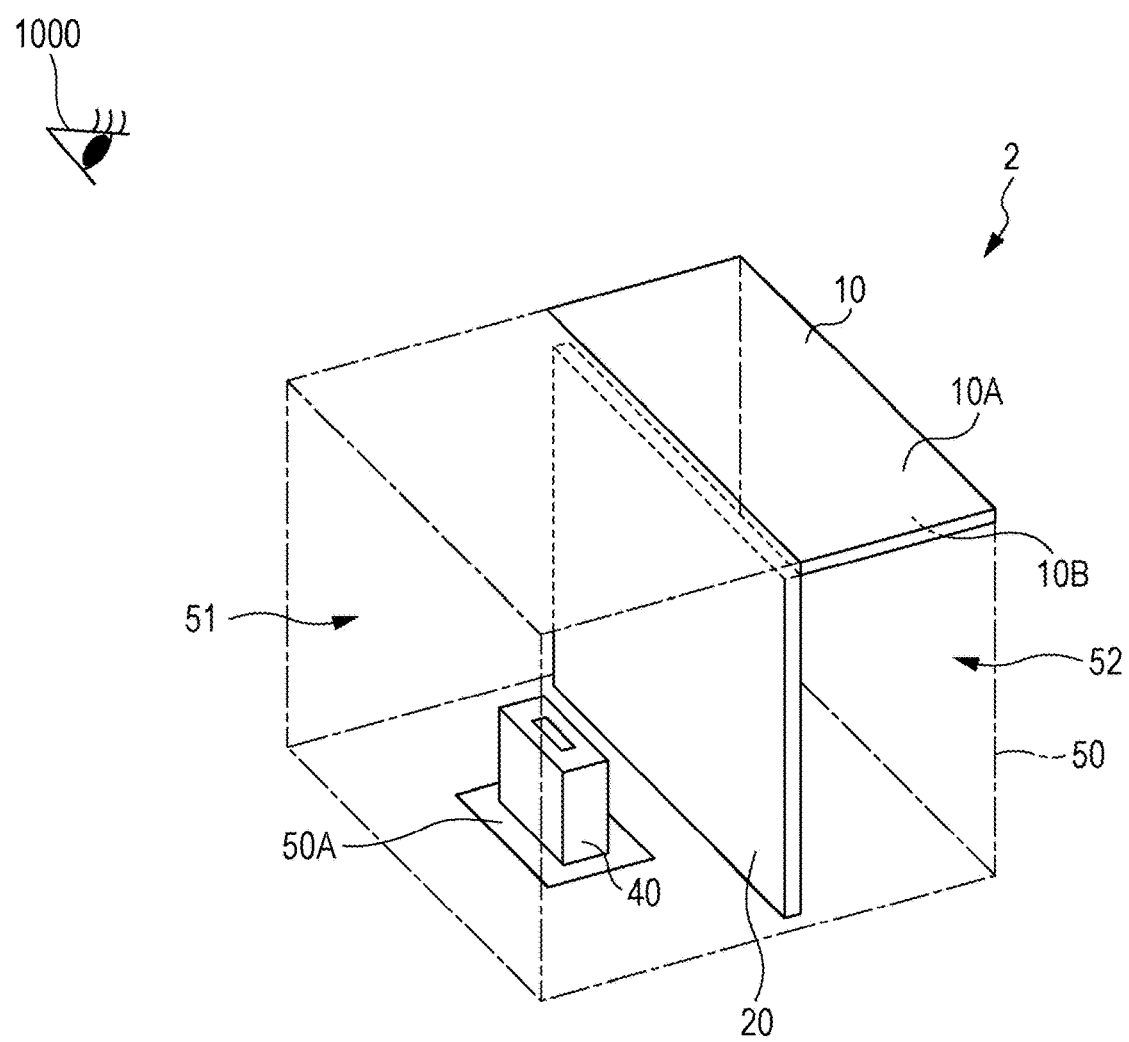
FIG. 12 is a view illustrating a modification example of the spatial image display apparatus in FIG. 10.
Figure 13:
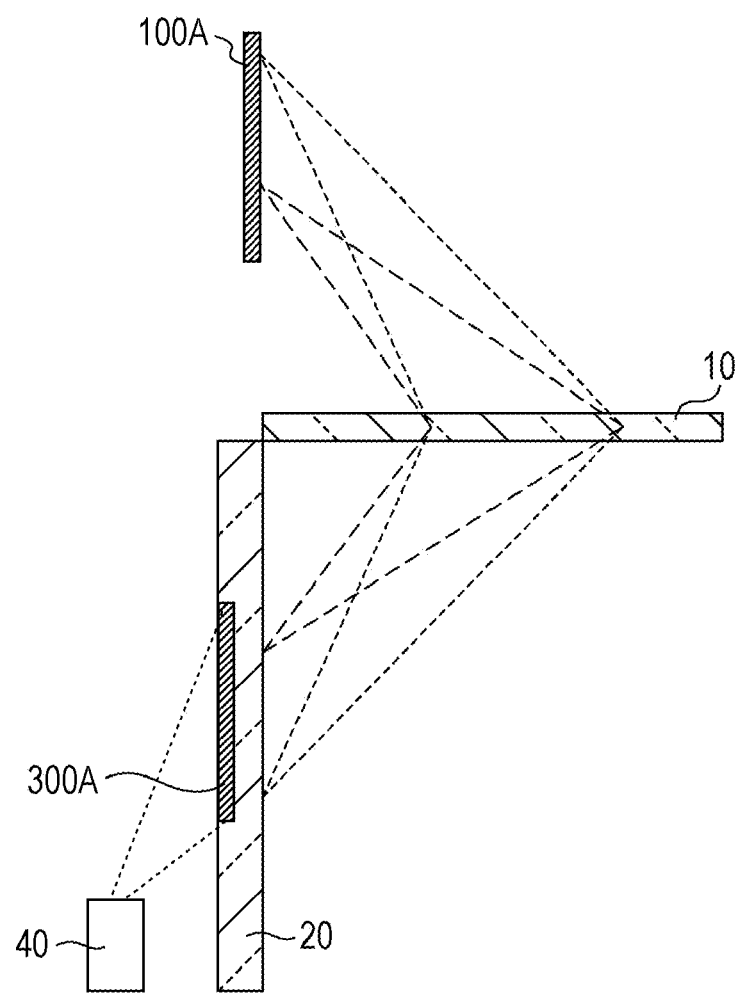
FIG. 13 is a view illustrating an example of action of the spatial image display apparatus in FIG. 12.

FIG. 12 is illustrates a modification example of the spatial image display apparatus 2 of the second embodiment described above. FIG. 13 illustrates an example of action of the spatial image display apparatus 2 to the present modification example. According to the present modification example, one of the two projectors 40 provided in the second embodiment described above is omitted. That is, the spatial image display apparatus 2 according to the present modification example includes, for example, the optical plates 10 and 20, one projector 40, and the housing 50 as illustrated in FIG. 12.

According to the present modification example, a two dimensional real image 100A is produced in a plane parallel to the optical plate 20 from the projection light emitted from the single projector 40. In addition, According to the present modification example, it is possible for the observer 1000 present on the left side in FIG. 13 to visually recognize the real image 100A, but it is not possible for the observer 1000 present on the right side in FIG. 13 to visually recognize the real image 100A. That is, since, to the observer 1000 present on the right side in FIG. 13, there is no image blocking a place where the real image 100A is present, the observer 1000 on the right side in FIG. 13 has an open visual field by the real image 100A without being blocked. Hence, the spatial image display apparatus 2 according to the present modification example is applied when it is desired to show the real image 100A to the observer 1000 present on the left side in FIG. 13, and not to block a visual field of the observer 1000 present on the right side in FIG. 13 by the real image 100A.

5. Third Embodiment

Configuration

Next, an spatial image display apparatus 3 according to a third embodiment of the present disclosure will be described. FIG. 14 is a perspective view illustrating an example of a configuration of the spatial image display apparatus 3. The spatial image display apparatus 3 displays an image in a space. The spatial image display apparatus 3 includes, for example, the optical plate 10, four optical plates 20, four projectors 40, and a housing 50. FIG. 14 illustrates a perspective view of a configuration of the spatial image display apparatus 3 with a transparent housing 50.

Optical Plate 20

Each of the optical plates 20 is disposed in front of the optical plate 10 on the optical path of the projection light emitted from the projector 40. The optical plate 10 and each of the optical plates 20 are disposed so as not to face each other. Each of the optical plates 20 is disposed at a position so as to confront the optical plate 10 and is disposed so as to be parallel to or to obliquely intersect with the normal line of the optical plate 10. The four optical plates 20 are contact with each other by one side thereof and the four optical plates 20 are disposed to form a cross together when viewed from a normal line direction of the optical plate 10.

Each of the optical plates 20 transmits the incident light beam such that transmission gain reaches a peak greater than 1 in the optical axis direction of the incident light beam. Each of the optical plates 20 causes the transmissive light as the diffusion light to be incident to the rear surface 10B of the optical plate 10.

Projector 40

Each of the projectors 40 has the projection optical system which can cause the projection light to be imaged. In each of the projectors 40, the projection optical system is adjusted at the time of using the projector 40 such that the imaging position becomes the front surface of the optical plate 20. That is, the projection light emitted from each of the projector 40 is primarily imaged on a corresponding front surface of the optical plate 20.

The first projector 40 causes to form a primary image on one surface of the two optical plates 20 (the first set of the optical plates 20) which are disposed on the same plane of the four optical plates 20 disposed in a cross and the second projector 40 causes to form a primary image on the other surface of the first set of the optical plates 20. That is, the first set of the optical plates 20 are irradiated from both surfaces by the two projectors 40.

The third projector 40 causes to form a primary image on one surface of the two optical plates 20 (the second set of the optical plates 20) which are disposed on the other same plane of the four optical plates 20 disposed in a cross and the fourth projector 40 causes to form a primary image on the other surface of the second set of the optical plates 20. That is, the second set of the optical plates 20 are irradiated from both surfaces by the two projectors 40.

Each of the projectors 40 is disposed at a position at which the optical axis of the projection light obliquely intersects with the normal line of the optical plate 20. The first projector 40 is disposed on the one surface side of the first set of the optical plates 20 and is disposed at a position at which the optical axis of the projection light obliquely intersects with the normal line of the first set of the optical plates 20. The second projector 40 is disposed on the other surface side of the first set of the optical plates 20 and is disposed at a position at which the optical axis of the projection light obliquely intersects with the normal line of the first set of optical plates 20. The third projector 40 is disposed on the one surface side of the second set of the optical plates 20 and is disposed at a position at which the optical axis of the projection light obliquely intersects with the normal line of the second set of the optical plates 20. The fourth projector 40 is disposed on the other surface side of the second set of the optical plates 20 and is disposed at a position at which the optical axis of the projection light obliquely intersects with the normal line of the second set of optical plates 20.

Projection light emitted from the first projector 40 is incident to a surface of the rear surface 10B of the optical plate 10 which is on the back surface side of the optical plate 20 which transmitted the projection light, through the first set of the optical plates 20. Projection light emitted from the second projector 40 is incident to the surface of the rear surface 10B of the optical plate 10 which is on the back surface side of the optical plate 20 which transmitted the projection light, through the first set of the optical plates 20. Projection light emitted from the third projector 40 is incident to a surface of the rear surface 10B of the optical plate 10 which is on the back surface side of the optical plate 20 which transmitted the projection light, through the second set of the optical plates 20. Projection light emitted from the fourth projector 40 is incident to the surface of the rear surface 10B of the optical plate 10 which is on the back surface side of the optical plate 20 which transmitted the projection light, through the second set of the optical plates 20.

The projectors 40 are mounted on the installation sections 50A formed in the housing 50, respectively. Each of the installation sections 50A is formed, for example, on the bottom of the housing 50, as illustrated in FIG. 14. Each of the projectors 40 is disposed at a position at which the projection light emitted from the projection optical system is obliquely incident to the front surface of the optical plate 20. An incidence angle of the projection light to the front surface of the optical plate 20 is, for example, an angle greater than 45 degrees. Further, each of the projectors 40 is disposed at a position at which the projection light is obliquely incident to the rear surface 10B of the optical plate 10 through the optical plate 20.

Housing 50

The housing 50 forms the interior space of the spatial image display apparatus 3 along with the optical plates 10 and 20. The housing 50 has, for example, a box shape. The housing 50 supports the projector 40 on the installation section 50A. The installation section 50A has a structure in which the projector 40 is disposed at a position at which the optical axis of the projection light obliquely intersects with the normal line of the optical plate 20 at the time of operation of the spatial image display apparatus 3. The housing 50 supports, in addition to the projector 40, further, for example, the optical plates 10 and 20. The housing 50 may have a light-absorbing member on the inner surface thereof.

After the light emitted from the first projector 40 forms an image on the one surface of the first set of the optical plates 20 and the real image 300A is produced, the light emitted from the real image 300A is transmitted through the optical plate 10 from the rear surface 10B. As a result, the light forms an image and the image formed on the front surface 10A side of the optical plate 10 is referred to as a real image 100A. In addition, after the light emitted from the first projector 40 forms an image on the other surface of the first set of the optical plates 20 and the real image 300B is produced, the light emitted from the real image 300B is transmitted through the optical plate 10 from the rear surface 10B. As a result, the light forms an image and the image formed on the front surface 10A side of the optical plate 10 is referred to as a real image 100B. After the light emitted from the third projector 40 forms an image on the one surface of the second set of the optical plates 20 and the real image 300C is produced, the light emitted from the real image 300C is transmitted through the optical plate 10 from the rear surface 10B. As a result, the light forms an image and the image formed on the front surface 10A side of the optical plate 10 is referred to as a real image 100C. In addition, after the light emitted from the fourth projector 40 forms an image on the other surface of the second set of the optical plates 20 and the real image 300D is produced, the light emitted from the real image 300D is transmitted through the optical plate 10 from the rear surface 10B. As a result, the light forms an image and the image formed on the front surface 10A side of the optical plate 10 is referred to as a real image 100D.

Action and Effects

Next, action and effects of the spatial image display apparatus 3 will be described.

The projection light emitted from each of the projector 40 forms an image on the front surface of the optical plate 20. Light of the formed images (real images 300A to 300D) is incident as diffusion light to the optical plate 10 by the optical plate 20. At this time, transmission gain in the light transmitted through the optical plate 20 reaches a peak greater than 1 in the optical axis direction of the incident light beam. The light transmitted through the optical plate 20 is obliquely incident to the rear surface 10B of the optical plate 10. In the light obliquely incident to the rear surface 10B of the optical plate 10, a Z axial direction component parallel to the normal line AX of the optical plate 10 (substrate 11) is reflected and X and Y axial direction components parallel to the rear surface 10B of the optical plate 10 are retroreflective. The light transmitted through the optical plate 10 in this manner converges (images) at the plane-symmetrical position in relation to the real images 300A to 300D with the surface including the optical plate 10 as a reference and forms the real images 100A to 100D.

According to the present embodiment, the real images 100A and 100B produced through the first set of the optical plates 20 are produced substantially at the same place. Further, the real images 100C and 100D produced through the second set of the optical plates 20 are produced substantially at the same place. The real images 100A and 100B and the real images 100C and 100D are superposed orthogonally to each other. That is, the real images 100A to 100D generated in the present embodiment are disposed so as to form a cross by the real images 100A to 100D when viewed from the normal line direction of the optical plate 10.

Therefore, in a case where the observer 1000 is present around the first projector 40, the observer 1000 can visually recognize only the light emitted from the real image 100A produced by the first projector 40. The observer 1000 around the first projector 40 visually recognizes only the real image 100A levitating in the air. In addition, in a case where the observer 1000 is present around the second projector 40, the observer 1000 can visually recognize only the light emitted from the real image 100B produced by the second projector 40. The observer 1000 around the second projector 40 visually recognizes only the real image 100B levitating in the air. In addition, in a case where the observer 1000 is present around the third projector 40, the observer 1000 can visually recognize only the light emitted from the real image 100C produced by the third projector 40. The observer 1000 around the third projector 40 visually recognizes only the real image 100C levitating in the air. In addition, in a case where the observer 1000 is present around the fourth projector 40, the observer 1000 can visually recognize only the light emitted from the real image 100D produced by the fourth projector 40. The observer 1000 around the fourth projector 40 visually recognizes only the real image 100D levitating in the air.

Here, the projection light emitted from the first projector 40 becomes image light in front of a certain object (for example, human being) and the real image 100A becomes an image (that is, an image in front of a certain object (for example, human being)) corresponding to the image light. Further, the projection light emitted from the second projector 40 becomes image light at the rear of a certain object (for example, human being) and the real image 100B becomes an image (that is, an image at the rear of a certain object (for example, human being)) corresponding to the image light. In addition, the projection light emitted from the third projector 40 becomes image light on the right side of a certain object (for example, human being) and the real image 100C becomes an image (that is, an image on the right side of a certain object (for example, human being)) corresponding to the image light. Further, the projection light emitted from the fourth projector 40 becomes image light on the left side of a certain object (for example, human being) and the real image 100D becomes an image (that is, an image on the left side of a certain object (for example, human being)) corresponding to the image light.

At this time, when the observer 1000 walks around the spatial image display apparatus 3, the observer 1000 perceives that the object (for example, human being) is present in a state of levitating in the air at the place where the four real images 100A is produced. In this manner, according to the present embodiment, images different from each other are projected from the projectors 40 and thereby, it is possible to display an image corresponding to an observing position.

Figure 18:
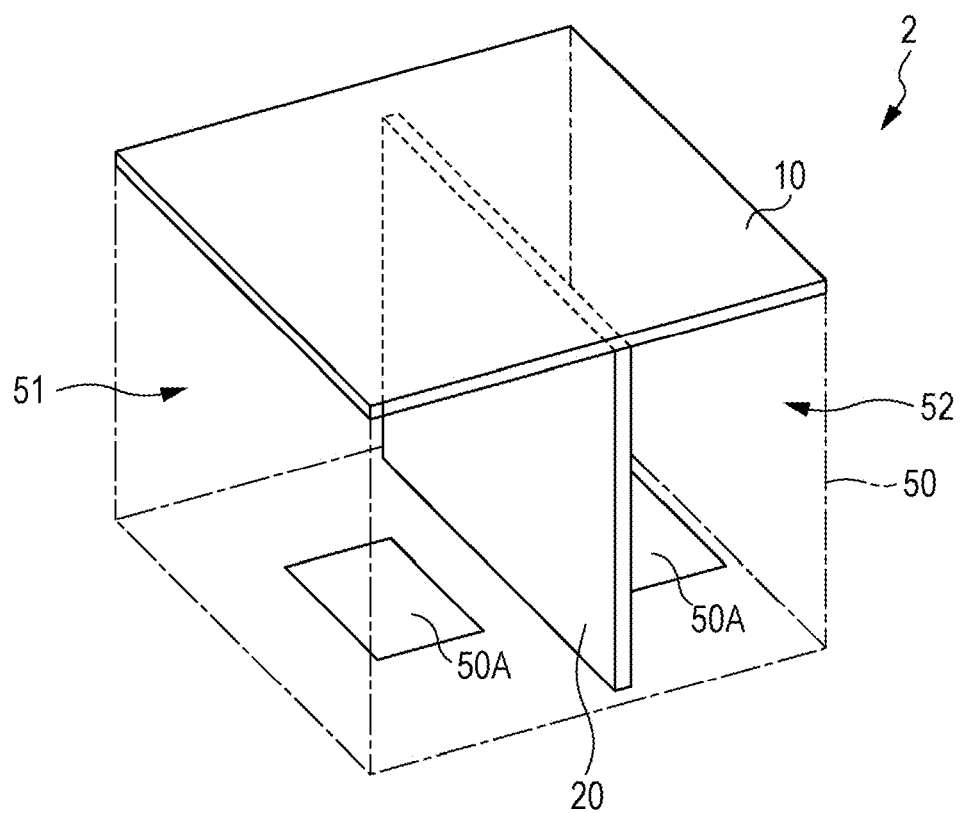
FIG. 18 is a view illustrating still another modification example of the spatial image display apparatus in FIG. 10.
Figure 19:
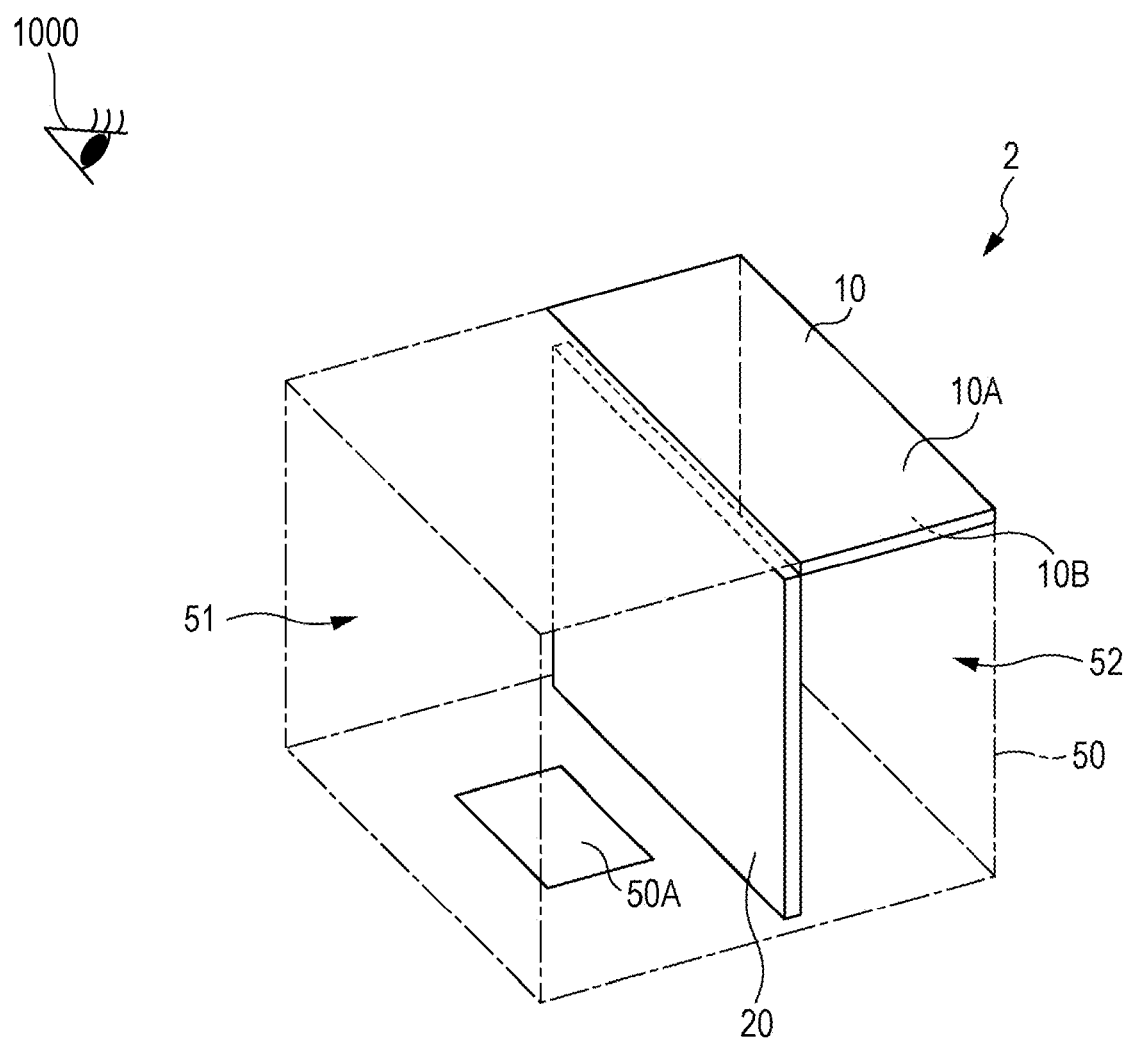
FIG. 19 is a view illustrating a modification example of the spatial image display apparatus in FIG. 12.

6. Modification Example Common to Each Embodiment and Modification Example Thereof Modification Example D FIG. 15 to FIG. 17 illustrate modification examples of the spatial image display apparatus 1 of the first embodiment described above and the modification example thereof. FIG. 18 and FIG. 19 illustrate modification examples of the spatial image display apparatus 2 of the second embodiment described above and the modification example thereof. FIG. 20 illustrates a modification example of the spatial image display apparatus 3 of the third embodiment described above. According to the present modification example, the projector 40 is omitted. That is, according to the present modification example, the projector 40 is positioned as an external component which is prepared separately when the spatial image display apparatuses 1, 2, and 3 are used.

In the present modification example, it is preferable that the spatial image display apparatuses 1, 2, and 3 have a mechanism which positions the projector 40 at a position at which the projector 40 is disposed. As such a mechanism, for example, as illustrated in FIGS. 15 to 20, the installation section 50A on which the projector 40 is disposed is provided in the housing 50. The installation section 50A is configured such that the projector 40 is disposed at a position at which the optical axis of the projection light obliquely intersects with the normal line of the optical plate 20. Further, according to the spatial image display apparatus 1 of the first embodiment described above and the modification example thereof, the installation section 50A is configured such that it is possible for the projection light emitted from the projector 40 to be reflected from the reflective plate 30.

As above, the present disclosure is described with the embodiments and the modification examples thereof; however, the present disclosure is not limited to the embodiments described above or the like, but can be variously modified. The effects described in the present specification are provided as an example. The effects of the present disclosure are not limited to the effects described in the present specification. The present disclosure may have other effects, in addition to the effects described in the present specification.

In addition, the present disclosure can employ the following configurations.

(1)

An spatial image display apparatus includes: a first optical plate that transmits an incident light beam such that transmission gain reaches a peak greater than 1 in an optical axis direction of the incident light beam; and a second optical plate in which a plurality of optical elements are provided in a matrix formation, which regularly reflect a Z axis-direction component of a transmissive light beam of the first optical plate and are retroreflective with X and Y axes-direction components of the transmissive light beam, in a substrate having a normal line in a Z axial direction.

(2)

In the spatial image display apparatus according to (1), the first optical plate and the second optical plate are disposed so as not to face each other. At a time of operating the spatial image display apparatus, a light source device that has an optical projection system which is able to form an image from projection light is disposed at a position at which a light axis of the projection light obliquely intersects with a normal line of the first optical plate.

(3)

In the spatial image display apparatus according to (1) or (2), the first optical plate and the second optical plate are disposed such that the normal lines thereof are parallel to each other.

(4)

The spatial image display apparatus according to any one of (1) to (3) further includes: one or a plurality of reflective plates which reflects the transmissive light beam of the first optical plate and thereby causes the transmissive light beam to be obliquely incident to the second optical plate.

(5)

In the spatial image display apparatus according to (4), a first reflective plate which is one of the one or the plurality of reflective plates is disposed between a symmetry position and the plurality of optical elements. When a surface of the second optical plate on a side of an observer corresponds to a front surface and a surface of the second optical plate on a side opposite to the front surface corresponds to a rear surface, the symmetry position is a plane-symmetrical position with a real image produced on the front surface side of the second optical plate with a surface including the second optical plate as a reference, as a result of the projection light being reflected from one or the plurality of reflective plates and then, being transmitted through the second optical plate from the rear surface side thereof.

(6)

In the spatial image display apparatus according to (1) or (2), the first optical plate is disposed at a position to confront the second optical plate and so as to be parallel to or obliquely intersect with a normal line of the second optical plate.

(7)

In the spatial image display apparatus according to (6), the first optical plate transmits the projection light incident from the light source device and thereby causes to be obliquely incident to the second optical plate.

(8)

The spatial image display apparatus according to any one of (1) to (7) further includes the light source device. The light source device is disposed at a position at which the light axis of the projection light obliquely intersects with the normal line of the first optical plate.

(9)

In the spatial image display apparatus according to (8), the light source device corresponds to a projector.

(10)

The spatial image display apparatus according to (6) or (7) further includes two light source devices. One of the light source devices is disposed on one surface side of the first optical plate, that is, at a position at which the light axis of the projection light obliquely intersects with the normal line of the first optical plate. The other light source device is disposed on the other surface side of the first optical plate, that is, at a position at which the light axis of the projection light obliquely intersects with the normal line of the first optical plate.

(11)

An spatial image display apparatus includes: a plurality of first optical plates that transmit an incident light beam such that transmission gain reaches a peak greater than 1 in an optical axis direction of the incident light beam; and a second optical plate in which a plurality of optical elements are provided in a matrix formation, which regularly reflect a Z axis-direction component of a transmissive light beam of each the first optical plates and are retroreflective with X and Y axes-direction components of the transmissive light beam, in a substrate having a normal line in a Z axial direction.

(12)

In the spatial image display apparatus according to (11), the first optical plate and the second optical plate are disposed so as not to face each other. At a time of operating the spatial image display apparatus, each of a plurality of light source devices that have an optical projection system which is able to form an image from projection light are disposed for each of the first optical plates at a position at which a light axis of the projection light obliquely intersects with a normal line of the corresponding first optical plate.

(13)

In the spatial image display apparatus according to (12), each of the first optical plates is disposed at a position to confront the second optical plate and so as to be parallel to or obliquely intersect with a normal line of the second optical plate.

(14)

In the spatial image display apparatus according to any one of (11) to (13), the number of the first optical plates becomes four, and the four first optical plates are disposed so as to surround an axis orthogonal to the second optical plate.

(15)

The spatial image display apparatus according to any one of (11) to (14) further includes: a plurality of the light source devices. Each of the light source devices is disposed for each of the first optical plates at a position at which a light axis of the projection light obliquely intersects with a normal line of the corresponding first optical plate.

(16)

In the spatial image display apparatus according to (15), each of the light source devices corresponds to a projector.

It should be understood by those skilled in the art that various modifications, combinations, sub-combinations and alterations may occur depending on design requirements and other factors insofar as they are within the scope of the appended claims or the equivalents thereof.

What is claimed is:

1. A spatial image display apparatus comprising:
   a first optical plate that transmits an incident light beam such that transmission gain reaches a peak greater than 1 in an optical axis direction of the incident light beam; and
   a second optical plate in which a plurality of optical elements are provided in a matrix formation, which regularly reflect a Z axis-direction component of a transmissive light beam of the first optical plate and are retroreflective with X and Y axes-direction components of the transmissive light beam, in a substrate having a normal line in a Z axial direction;
   wherein the first optical plate and the second optical plate are disposed so as not to face each other, and
   wherein, at a time of operating the spatial image display apparatus, a light source device that has an optical projection system which is able to form an image from projection light is disposed at a position at which a light axis of the projection light obliquely intersects with a normal line of the first optical plate.

2. The spatial image display apparatus according to claim 1,
   wherein the first optical plate and the second optical plate are disposed such that the normal lines thereof are parallel to each other.

3. The spatial image display apparatus according to claim 2, further comprising:
   one or a plurality of reflective plates which reflects the transmissive light beam of the first optical plate and thereby causes the transmissive light beam to be obliquely incident to the second optical plate.

4. The spatial image display apparatus according to claim 3,
   wherein a first reflective plate which is one of the one or the plurality of reflective plates is disposed between a symmetry position and the plurality of optical elements,
   wherein, when a surface of the second optical plate on a side of an observer corresponds to a front surface and a surface of the second optical plate on a side opposite to the front surface corresponds to a rear surface, the symmetry position is a plane-symmetrical position with a real image produced on the front surface side of the second optical plate with a surface including the second optical plate as a reference, as a result of the projection light being reflected from one or the plurality of reflective plates and then, being transmitted through the second optical plate from the rear surface side thereof.

5. The spatial image display apparatus according to claim 1,
   wherein the first optical plate is disposed at a position to confront the second optical plate and so as to be parallel to or obliquely intersect with a normal line of the second optical plate.

6. The spatial image display apparatus according to claim 5, wherein the first optical plate transmits the projection light incident from the light source device and thereby causes to be obliquely incident to the second optical plate.

7. The spatial image display apparatus according to claim 1, further comprising:
the light source device,
wherein the light source device is disposed at a position at which the light axis of the projection light obliquely intersects with the normal line of the first optical plate.

8. The spatial image display apparatus according to claim 7,
wherein the light source device corresponds to a projector.

9. The spatial image display apparatus according to claim 5, further comprising:
two light source devices,
wherein one of the light source devices is disposed on one surface side of the first optical plate, that is, at a position at which the light axis of the projection light obliquely intersects with the normal line of the first optical plate, and
wherein the other light source device is disposed on the other surface side of the first optical plate, that is, at a position at which the light axis of the projection light obliquely intersects with the normal line of the first optical plate.

10. A spatial image display apparatus comprising:
a plurality of first optical plates that transmit an incident light beam such that transmission gain reaches a peak greater than 1 in an optical axis direction of the incident light beam; and
a second optical plate in which a plurality of optical elements are provided in a matrix formation, which regularly reflect a Z axis-direction component of a transmissive light beam of each the first optical plates and are retroreflective with X and Y axes-direction components of the transmissive light beam, in a substrate having a normal line in a Z axial direction;
wherein the first optical plate and the second optical plate are disposed so as not to face each other, and
wherein, at a time of operating the spatial image display apparatus, each of a plurality of light source devices that have an optical projection system which is able to form an image from projection light are disposed for each of the first optical plates at a position at which a light axis of the projection light obliquely intersects with a normal line of the corresponding first optical plate.

11. The spatial image display apparatus according to claim 10,
wherein each of the first optical plates is disposed at a position to confront the second optical plate and so as to be parallel to or obliquely intersect with a normal line of the second optical plate.

12. The spatial image display apparatus according to claim 11,
wherein the number of the first optical plates becomes four, and
wherein the four first optical plates are disposed so as to surround an axis orthogonal to the second optical plate.

13. The spatial image display apparatus according to claim 10, further comprising: a plurality of the light source devices, wherein each of the light source devices is disposed for each of the first optical plates at a position at which a light axis of the projection light obliquely intersects with a normal line of the corresponding first optical plate.

14. The spatial image display apparatus according to claim 13,
wherein each of the light source devices corresponds to a projector.

* * * * *